(12) United States Patent
Hayashi et al.

(10) Patent No.: US 9,286,536 B2
(45) Date of Patent: Mar. 15, 2016

(54) IMAGE PROCESSING SYSTEM FOR DETERMINING A BOUNDARY LINE USING A SHADOW IMAGE

(71) Applicant: PFU LIMITED, Kahoku-shi, Ishikawa (JP)

(72) Inventors: Masayoshi Hayashi, Kahoku (JP); Hiroyuki Sakano, Kahoku (JP); Akira Iwayama, Kahoku (JP)

(73) Assignee: PFU Limited, Kahoku-shi (JP)

( * ) Notice: Subject to any disclaimer, the term of this patent is extended or adjusted under 35 U.S.C. 154(b) by 323 days.

(21) Appl. No.: 13/936,774

(22) Filed: Jul. 8, 2013

(65) Prior Publication Data

US 2014/0093177 A1    Apr. 3, 2014

(30) Foreign Application Priority Data

Sep. 28, 2012   (JP) ................................ 2012-216040

(51) Int. Cl.
*G06K 9/00*    (2006.01)
*G06K 9/46*    (2006.01)
(Continued)

(52) U.S. Cl.
CPC .......... *G06K 9/4604* (2013.01); *G06K 9/00442* (2013.01); *G06K 9/00449* (2013.01); *G06K 9/00463* (2013.01); *G06K 9/4638* (2013.01); *G06T 7/004* (2013.01); *G06T 7/0079* (2013.01); *G06T 7/0083* (2013.01); *H04N 1/0075* (2013.01); *H04N 1/00708* (2013.01); *H04N 1/00742* (2013.01); *H04N 1/00745* (2013.01); *H04N 1/00748* (2013.01); *H04N 1/00753* (2013.01); *G06K 2209/01* (2013.01)

(58) Field of Classification Search
USPC ......... 382/100, 101, 112, 113, 135, 137, 173, 382/174, 180, 192, 193, 194, 199, 202, 224, 382/225, 256, 258, 266, 273, 274, 286, 325
See application file for complete search history.

(56) References Cited

U.S. PATENT DOCUMENTS

| 7,483,564 B2 * | 1/2009 | Jia ............................ H04N 1/38 382/154 |
| 7,554,698 B2 * | 6/2009 | Dolan ................. H04N 1/00753 382/289 |
| 8,390,896 B2 * | 3/2013 | Oiwa .................. H04N 1/00708 358/3.26 |

(Continued)

FOREIGN PATENT DOCUMENTS

| JP | 2004-005051 | 1/2004 |
| JP | 2009-218953 | 9/2009 |
| WO | WO 2012023593 A1 * | 2/2012 |

*Primary Examiner* — Eric Rush
(74) *Attorney, Agent, or Firm* — Lewis Roca Rothgerber Christie LLP

(57) ABSTRACT

An image processing apparatus including a candidate pixel detector for detecting candidate pixels of boundary lines of sides of a document region, a classifier for classifying coordinates of the candidate pixels into coordinate groups, an approximate line calculator for calculating approximate lines for the boundary line based on each of the coordinate groups, a provisional line determination unit for determining a provisional line of the boundary line based on the approximate lines that is selected based on the number of candidate pixels that are within a distance from the approximate line, a shadow detector for detecting a shadow image of an edge of the document within a predetermined distance from the provisional line, and a boundary line determination unit for determining whether the boundary line is within the predetermined distance from the provisional line based on the shadow image.

11 Claims, 31 Drawing Sheets

(51) Int. Cl.
*H04N 1/00* (2006.01)
*G06T 7/00* (2006.01)

(56) References Cited

U.S. PATENT DOCUMENTS

| | | | |
|---|---|---|---|
| 8,792,139 B2* | 7/2014 | Makino | H04N 1/401 358/1.9 |
| 2002/0041406 A1* | 4/2002 | Takahashi et al. | 358/519 |
| 2005/0226510 A1* | 10/2005 | Eguchi et al. | 382/199 |
| 2008/0024845 A1* | 1/2008 | Makino et al. | 358/538 |
| 2008/0240618 A1* | 10/2008 | Chen et al. | 382/305 |
| 2009/0141312 A1* | 6/2009 | Lee | 382/275 |
| 2009/0231639 A1 | 9/2009 | Iwayama | |
| 2012/0257833 A1* | 10/2012 | Guo et al. | 382/199 |
| 2013/0121595 A1* | 5/2013 | Kawatani | G06K 9/00449 382/199 |

* cited by examiner

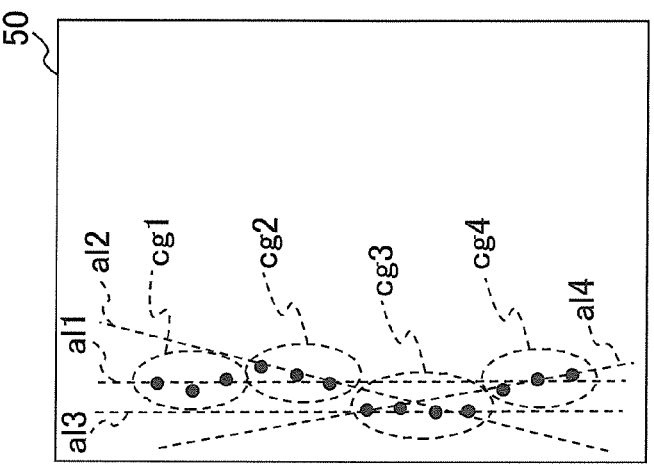
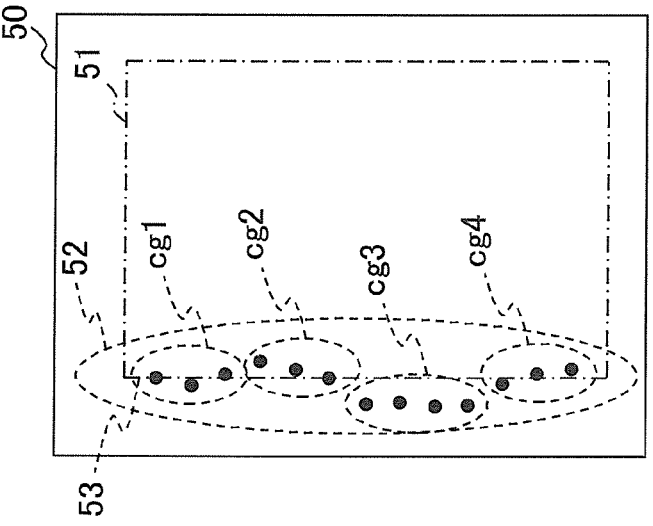
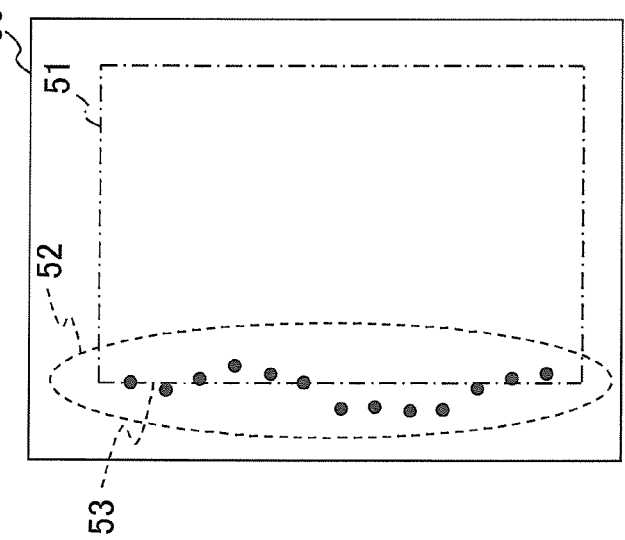

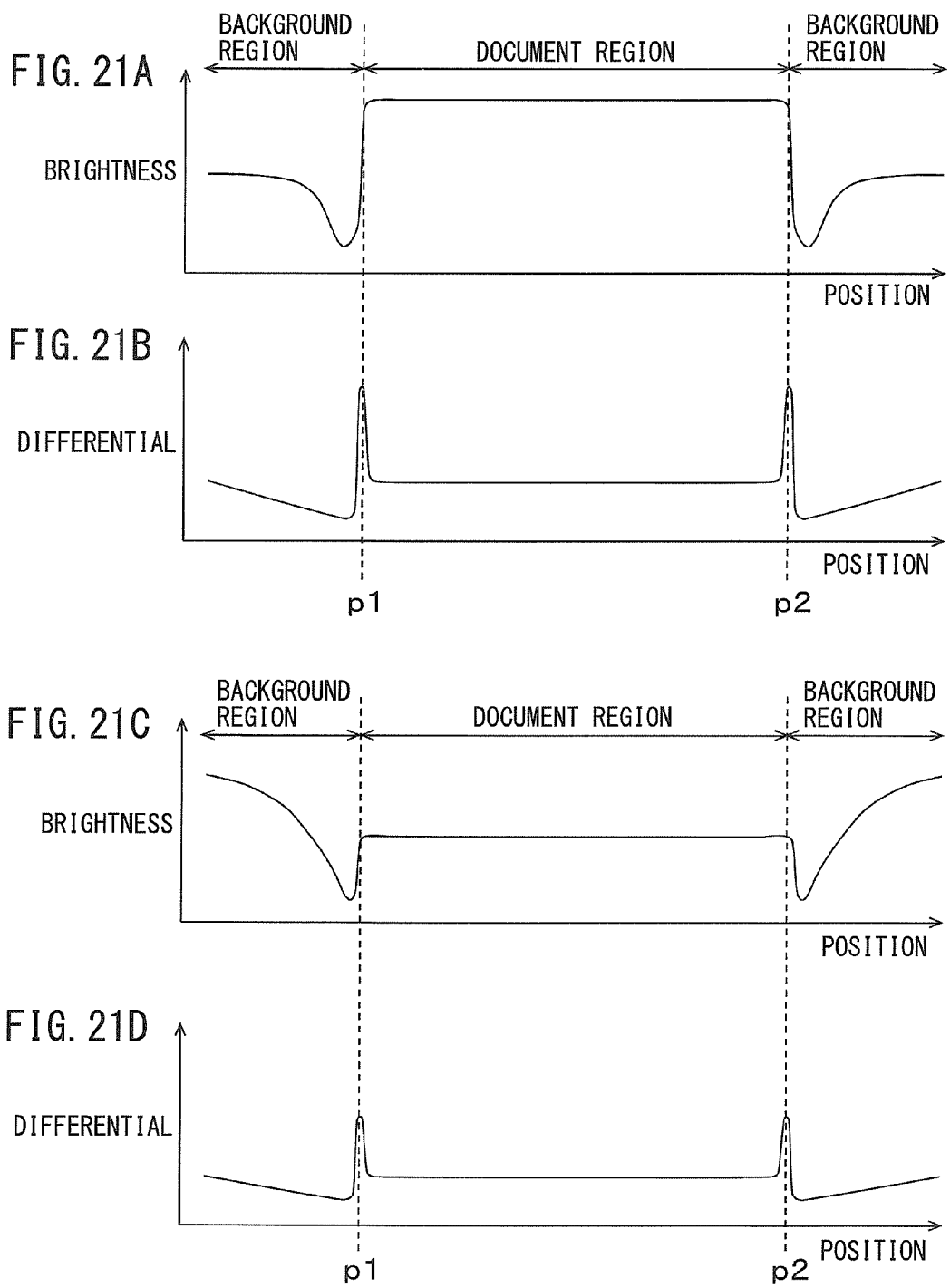

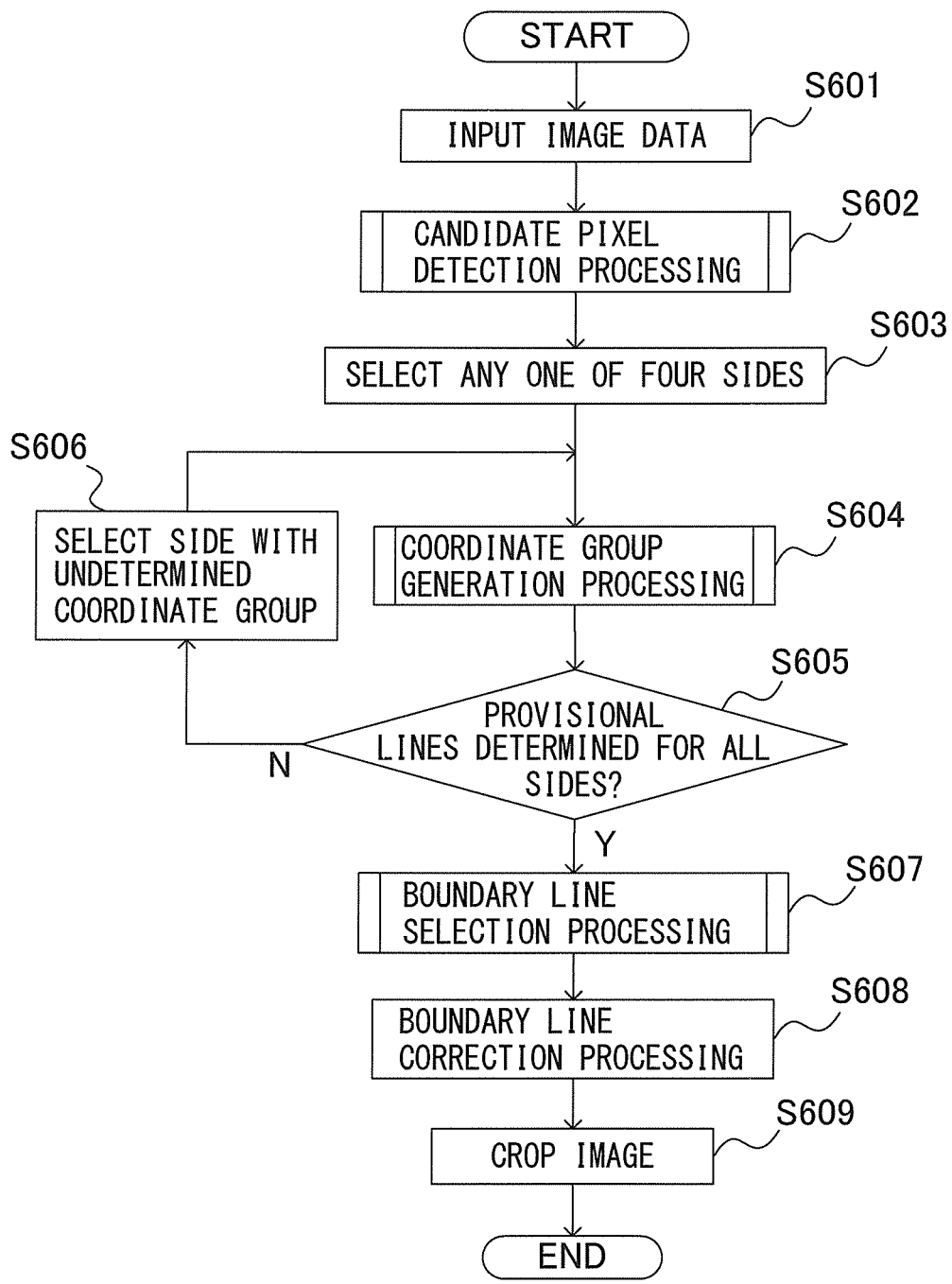

US 9,286,536 B2

IMAGE PROCESSING SYSTEM FOR DETERMINING A BOUNDARY LINE USING A SHADOW IMAGE

CROSS-REFERENCE TO RELATED APPLICATIONS

This application is based upon and claims the benefit of priority of prior Japanese Patent Application No. 2012-216040, filed on Sep. 28, 2012, the entire contents of which are incorporated herein by reference.

FIELD

Embodiments illustrated herein relate to an image processing apparatus, an image processing system, and a computer readable medium, and particularly relates to detection of a boundary line between a document region and a background region in image data.

BACKGROUND

An image processing apparatus has been known which acquires image data by reading a document and detects a document region from the image data. For example, the image processing apparatus acquires an image containing a document region, detects coordinate values of edge candidate pixels based on the obtained image, calculates the tilting of the document region based on the detected coordinate values of the edge candidate pixels, and extracts coordinate values of edge end candidate pixels based on the detected coordinate values of the edge candidate pixels. Then, the image processing apparatus calculates a line corresponding to an edge based on the calculated tilting of the document region and the extracted coordinate values of edge end candidate pixels, and corrects the tilting of the document region on the basis of the calculated line corresponding to the edge, and crops the document region from the image based on the relevant straight line.

As a related art, a stamp detector has been known which detects a shadow that appears on an image acquired by reading a paper sheet, the shadow being caused by the thickness of a stamp stuck onto the paper sheet, and detects the position of the whole stamp based on the detected shadow.

Related art is disclosed in Japanese Laid-open Patent Publications No. 2009-218953 and No. 2004-5051.

SUMMARY

Vertical line noise is one example that causes incorrect detection of a boundary line between a document region and a background region. The vertical line noise is linear noise that extends along a vertical scanning direction of a document by the image reading device. The vertical line noise may be caused by a smudge on a reading unit or a backing member in a scanner provided with an ADF (automatic document feeder) device, for example.

In addition, when a brightness difference between the document and the backing member of the image reading device is small for example, a brightness difference between the document region and the background region in image data may be small. FIG. 1 is a schematic diagram illustrating image data in which the brightness difference between the document region and the background region is small. Image data 900 includes a document region 901 and a background region 902, and a brightness difference between the document region 901 and the background region 902 is relatively small.

Therefore, a brightness change in the document region 901 may be incorrectly detected as the boundary between the document region 901 and the background region 902. A pixel 903 is a candidate pixel detected as a boundary between the document region 901 and the background region 902, and a pixel 904 is a candidate pixel incorrectly detected as a boundary point due to a brightness change in the document region 901. When a boundary line 905 of a side is approximated based on these candidate pixels 903 and 904, an error may be produced.

An apparatus, a system and a computer readable medium disclosed in the present specification is intended to determine incorrect detection when a boundary line between a document region and a boundary region is incorrectly detected.

In accordance with an aspect of the embodiment, there is provided an image processing apparatus including a candidate pixel detector for detecting candidate pixels that are candidates for pixels constituting boundary lines of sides of a document region from image data, a classifier for classifying coordinates of the candidate pixels into a plurality of coordinate groups, an approximate line calculator for calculating a plurality of approximate lines for the boundary line based on the coordinates belonging to each of the plurality of coordinate groups, a provisional line determination unit for selecting any one of the approximate lines based on the number of candidate pixels that are within a predetermined distance from the respective approximate lines and determining a provisional line of the boundary line based on the selected approximate line, a shadow detector for detecting a shadow image of an edge of the document within a predetermined distance from the provisional line and a boundary line determination unit for determining whether the boundary line is within the predetermined distance from the provisional line based on a detection result of the shadow image.

In accordance with another aspect of the embodiment, there is provided an image processing system including an image reading device and a computer that receives an image read by the image reading device via communication with the image reading device. The image processing system including a candidate pixel detector for detecting candidate pixels that are candidates for pixels constituting boundary lines of sides of a document region from image data read by the image reading device, a classifier for classifying coordinates of the candidate pixels into a plurality of coordinate groups, an approximate line calculator for calculating a plurality of approximate lines for the boundary line based on the coordinates belonging to each of the plurality of coordinate groups, a provisional line determination unit for selecting any one of the approximate lines based on the number of the candidate pixels that are within a predetermined distance from the respective approximate lines and determining a provisional line of the boundary line based on the selected approximate line, a shadow detector for detecting a shadow image of an edge of the document within a predetermined distance from the provisional line, and a boundary line determination unit for determining whether the boundary line is within the predetermined distance from the provisional line based on a detection result of the shadow image.

In accordance with another aspect of the embodiment, there is provided a computer-readable, non-transitory medium storing a computer program for causing a computer to execute a process. The process includes detecting candidate pixels that are candidates for pixels constituting boundary lines of sides of a document region from image data, classifying coordinates of the candidate pixels into a plurality of coordinate groups, calculating a plurality of approximate lines for the boundary line based on the coordinates belonging to each of the plurality of coordinate groups, selecting any one of the approximate lines based on the number of candidate pixels that are within a predetermined distance from the respective approximate lines and determining a provisional line of the boundary line based on the selected approximate line, detecting a shadow image of an edge of the document within a predetermined distance from the provisional line, and determining whether the boundary line is within the predetermined distance from the provisional line based on a detection result of the shadow image.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIGS. 4A to 4C are diagrams illustrating the processing depicted in FIG. 3.

FIG. 21A is a diagram illustrating a brightness change in image data.

FIG. 21B is a diagram illustrating a differential value of brightness.

FIG. 21C is a diagram illustrating a brightness change in image data.

FIG. 21D is a diagram illustrating a differential value of brightness.

FIG. 27 is a diagram illustrating a second example of processing by the image processing system 1.

DESCRIPTION OF EMBODIMENTS

<1. Hardware Configuration>

Figure 1:
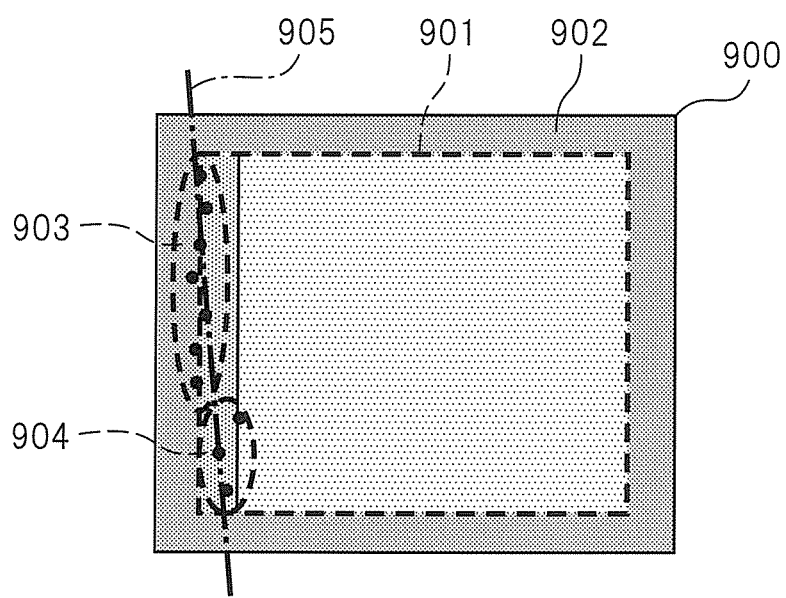
FIG. 1 is a schematic diagram illustrating image data in which a brightness difference between a document region and a background region is small.
Figure 2:
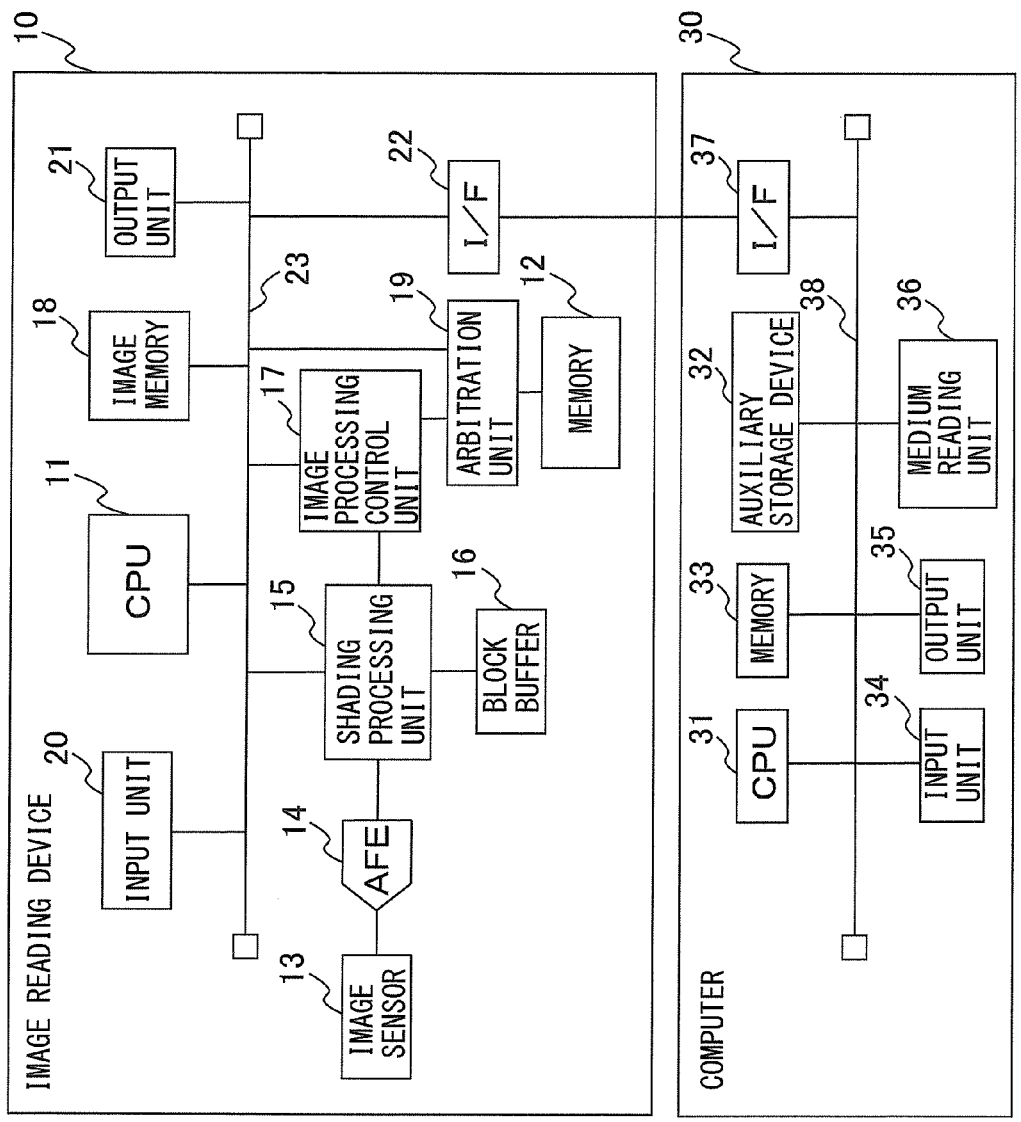
FIG. 2 is a diagram illustrating a hardware configuration of an image processing system 1.

Hereinafter, an image reading device and an image processing system will be described with reference to drawings. FIG. 2 is a diagram illustrating a hardware configuration of the image processing system. Note that the technical scope of the present invention is not limited to the embodiments and extends to the inventions set forth in claims and the equivalents thereof.

The image processing system 1 includes an image reading device 10 and a computer 30. The image reading device 10 reads a two-dimensional document and generates an image signal corresponding to the document. The image reading device 10 may be, for example, an image reader that reads by scanning a two-dimensional document irradiated with a plurality of light sources. Examples of such an image reader include various scanners such as a feeder scanner, a flatbed scanner, a handy scanner, and the like. The image reading device 10 is one example of the image processing apparatus.

The computer 30 can communicate with the image reading device 10 via a wired or wireless communication line, and receives an image signal of the document read by the image reading device 10 via the communication line from the image reading device 10.

The image reading device 10 includes a CPU (Central Processing Unit) 11, a memory 12, an image sensor 13, an AFE (Analog Front-End Processor) 14, a shading processing unit 15, and a block buffer 16. The image reading device 10 also includes an image processing control unit 17, an image memory 18, an arbitration unit 19, an input unit 20, an output unit 21, an interface (I/F) 22 and a bus 23.

The CPU 11 controls operation of the image reading device 10 in accordance with the computer program stored in the memory 12. In an embodiment, the CPU 11 may perform image processing on a document image read by the image reading device 10. The memory 12 may also store a computer program for such image processing. The memory 12 stores a computer program to be executed by the CPU 11, and data to be used in the execution of the computer program. The memory 12 may include a non-volatile storage for storing a program and a volatile memory for temporarily storing data.

The image sensor 13 captures an image of a two-dimensional document, and outputs an image signal corresponding to the document. The image sensor 13 includes: an imaging device such as CCD (Charge Coupled Device) sensors or CMOS (Complementary Metal Oxide Semiconductor) sensors that are arranged in one-dimensional or two-dimensional array, and an optical system forming an image of the document on the imaging device. The AFE 14 performs signal processing amplification, and other signal processing on the image signal outputted from the image sensor 13, and then inputs the processed signal to the shading processing unit 15.

The shading processing unit 15 stores the image signal received from AFE 14 as image data in the block buffer, performs shading processing on the image data, and then outputs the processed image data to the image processing control unit 17. The image processing control unit 17 performs predetermined image processing on the image data after shading processing, and stores the image data in the image memory 18. In another embodiment, the shading processing unit 15 may store the image data after shading processing in the image memory 18, and the image processing control unit 17 may take the image data from the image memory 18. The arbitration unit 19 arbitrates access to the memory 12 by the image processing control unit 17 in image processing and access to the memory 12 by the CPU 11 so as not to compete with each other.

In an embodiment, the shading processing unit 15, image processing control unit 17, and arbitration unit 19 may be mounted to the image reading device 10 as a logic circuit. The logic circuit may be, for example, an LSI (Large Scale Integration), an ASIC (Application Specific Integrated Circuit), an FPGA (Field Programming Gate Array), or the like. In another embodiment, the shading processing unit 15, image processing control unit 17, and arbitration unit 19 may be mounted to the image reading device 10 as an electronic circuit including a processor such as a CPU, a DSP (Digital Signal Processor), or the like, and a memory storing a program to be executed by the processor.

The input unit 20 is an input device that receives input operation from a user. The input unit 20 may be, for example, a button, a scroll wheel, a key pad, a keyboard, a pointing device, a touch panel, or the like. The output unit 21 is an output device for presenting a variety of information from the image reading device 10 to a user. The output unit 21 may be, for example, a display device that visually displays information to be presented to a user. The output unit 21 may be a display device such as a light emitting device, a liquid crystal display, an organic electro-luminescence display, or the like. The output unit 21 may be a speaker that outputs an audio signal and a drive circuit thereof.

The I/F 22 is a wired and/or wireless communication interface between the image reading device 10 and the computer 30. The image reading device 10 can transmit the image data of the read document via the I/F 22 to the computer 30. The image reading device 10 receives setting information and an instruction on operation of the image reading device 10 from the computer 30 via the I/F 22. In an embodiment, the image reading device 10 may receive image data subjected to processing by the computer 30 via the I/F 22. The CPU 11, the shading processing unit 15, the image processing control unit 17, the arbitration unit 19, the input unit 20, the output unit 21 and I/F 22 are electrically connected by the bus 23.

On the other hand, the computer 30 includes a CPU 31, an auxiliary storage device 32, a memory 33, an input unit 34, an output unit 35, a medium reading unit 36, an I/F 37 and a bus 38. The CPU 31 executes a computer program stored in the auxiliary storage device 32 to perform information processing in accordance with the computer program. In an embodiment, the CPU 31 may perform image processing on the document image read by the image reading device 10. The auxiliary storage device 32 may store a computer program for such image processing. The auxiliary storage device 32 may include a non-volatile memory, a ROM (Read Only Memory), a hard disc, and the like, for storing a computer program.

The memory 33 stores a program being executed by the CPU 31, and data to be temporarily used by this program. The memory 33 may include a RAM (Random Access Memory). The input unit 34 is an input device that receives input operation by a user. The input unit 34 may be, for example, a key pad, a keyboard, a pointing device, a touch panel, or the like.

The output unit 35 is an output device that outputs a signal processed by the computer 30. For example, the output unit 35 may be a display device that visually displays information processed by the computer 30 to a user. The output unit 35 may be, for example, a display device such as a liquid crystal display, a CRT (Cathode Ray Tube) display, an organic electro-luminescence display, or the like. The output unit 35 may be a speaker that outputs an audio signal and a drive circuit thereof.

The medium reading unit 36 is an input device that reads data stored in a computer-readable portable recording medium. The medium reading unit 36 may be, for example, a CD ROM drive, a DVD ROM drive, a flexible disc drive, a CD-R drive, a DVD-R drive, a MO drive, an access device to a flash memory device, and the like.

The I/F 37 is a wired and/or wireless communication interface between the image reading device 10 and the computer 30. The computer 30 can receive the image data of document read by the image reading device 10 via the I/F 37. The computer 30 transmits setting information and an instruction on operation of the image reading device 10 via the I/F 37 to the image reading device 10. The CPU 31, the auxiliary storage device 32, the memory 33, the input unit 34, the output unit 35, the medium reading device 36, and the I/F 37 are electrically connected via the bus 38.

<2. First Embodiment>
<2.1 Overview>

Figure 3:
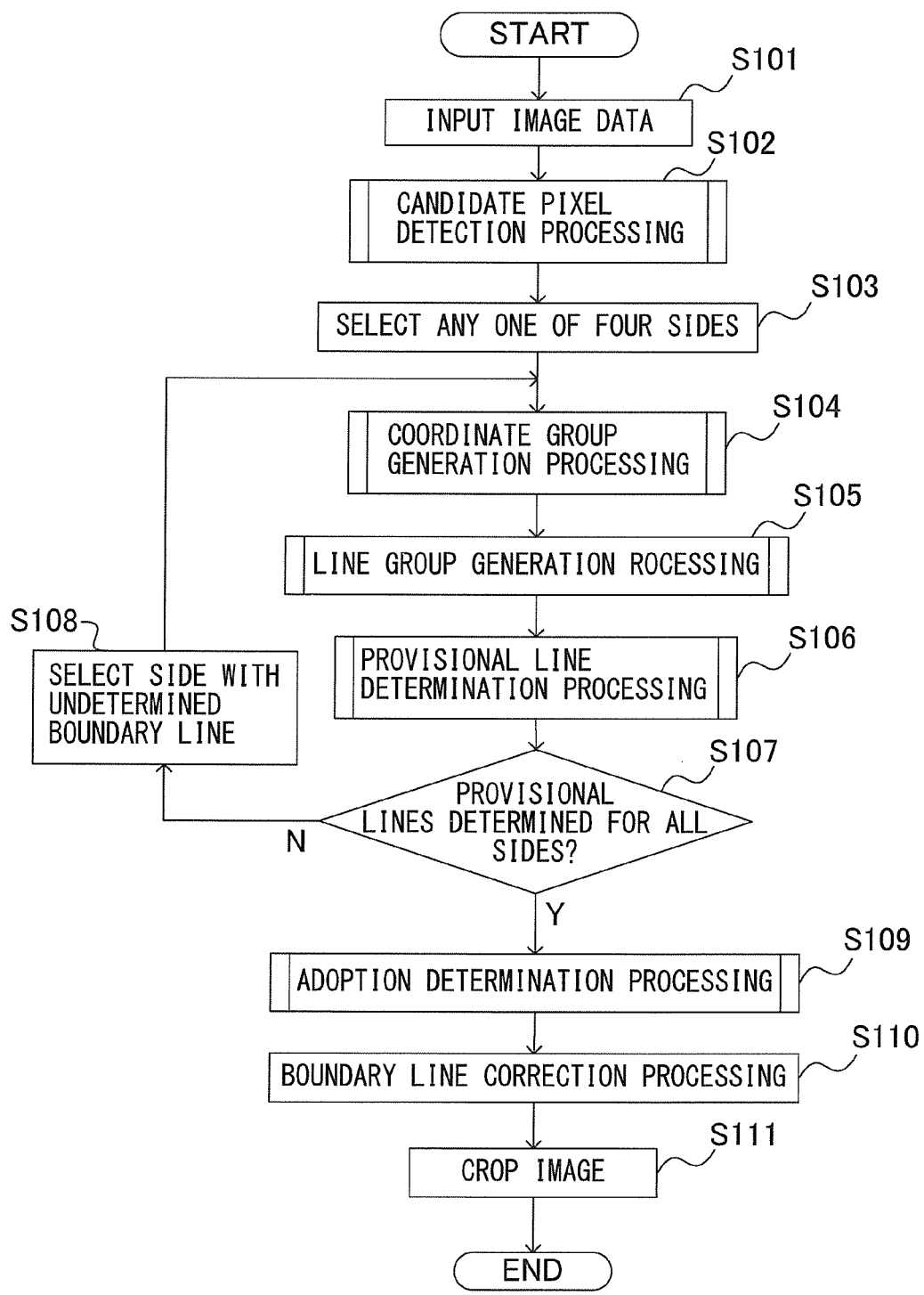
FIG. 3 is a diagram illustrating a first example of processing performed by the image processing system 1.

FIG. 3 is a diagram illustrating a first example of processing performed by the image processing system 1. At step S101, the image processing system 1 takes image data as input. FIG. 4A illustrates image data to be inputted. Image data 50 include a document region 51 corresponding to a document read by the image reading device 10. At step S102, the image processing system 1 detects candidate pixels on respective sides of the document region, the candidate pixels being candidates for pixels composing boundary lines between the document region and its exterior on the respective sides. In FIGS. 4A to 4C, 5A and 5B, candidate pixels detected on a boundary line 53 of a side 52 are depicted in black dots as an example.

At step S103, the image processing system 1 selects any one of the sides of the document region. The following steps S104 to S106 are performed for each of the sides of the document region.

At step S104, the image processing system 1 classifies candidate pixels detected on a plurality of points on the boundary line 53 into different groups to generate a plurality of coordinate groups. FIG. 4B illustrates candidate pixels classified in coordinate groups cg1 to cg4.

At step S105, the image processing system 1 determines a line group formed by a set of candidate pixels belonging to the plurality of coordinate groups. At this time, the image processing system 1 calculates respective approximate lines of the boundary line 53 based on the candidate pixels belonging to the respective coordinate groups cg1 to cg4. Various calculation methods such as least square method and Hough transformation may be utilized for calculating the approximate lines from the coordinates of the candidate pixels. In FIG. 4C, approximate lines al1 to al4 are calculated based on the candidate pixels belonging to the coordinate groups cg1 to cg4, respectively.

Figure 5A:
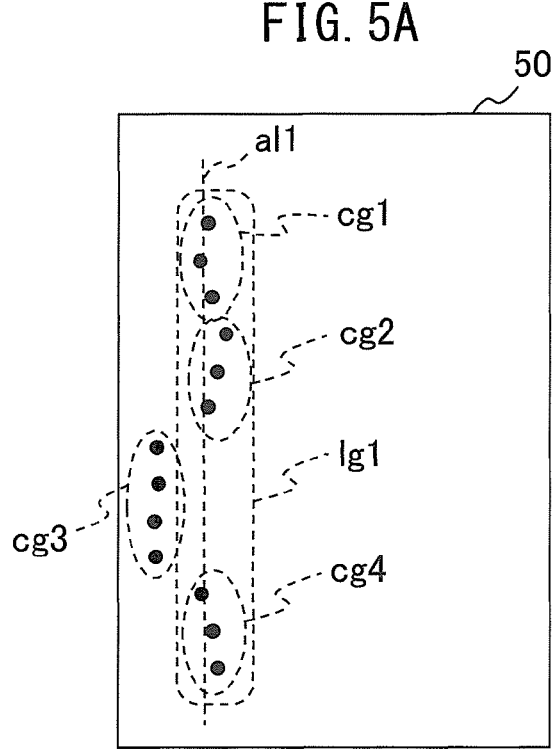
FIGS. 5A and 5B are diagrams illustrating the processing depicted in FIG. 3.
Figure 5B:
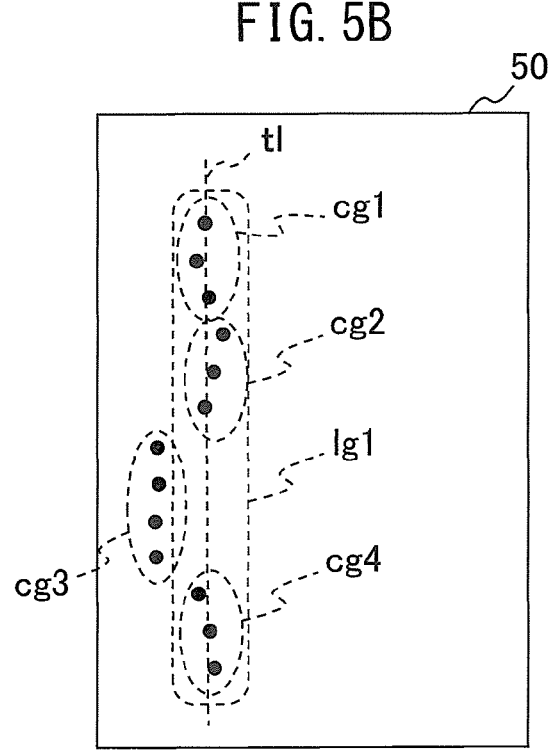

Next, with respect to each of the approximate lines al1 to al4, the image processing system 1 forms a set of candidate pixels within a predetermined distance from the approximate line, and determines the each set as one line group. FIG. 5A is a diagram illustrating a line group lg1 formed by a set of candidate pixels within a predetermined distance from the approximate line al1. The line group lg1 includes candidate pixels belonging to the coordinate groups cg1, cg2, and cg4. These candidate pixels belonging to the coordinate groups cg1, cg2, and cg4 are within a predetermined distance from the approximate line al1. Line groups are determined in the same manner for other approximate lines al2 to al4.

At step S106, the image processing system 1 determines a provisional line for the boundary line 53. The image processing system 1 selects, from among the line groups generated at step S105, a line group including the largest number of candidate pixels. In this example, the line group lg1 depicted in FIG. 5A is selected as a line group including the largest number of candidate pixels.

The image processing system 1 determines a provisional line for the boundary line 53 based on the candidate pixels included in the selected line group. In order to determine a provisional line from the coordinates of the candidate pixels, various calculation methods such as the least square method and Hough transformation can be utilized. In the example depicted in FIG. 5B, the image processing system 1 determines a provisional line tl for the boundary line 53 on the basis of the candidate pixels belonging to the coordinate groups cg1, cg2 and cg4.

At step S107, the image processing system 1 determines whether provisional lines are determined for all sides. If a provisional line is not determined for all sides (step S107: N), the processing proceeds to step S108. If provisional lines are determined for all sides (step S107: Y), the processing proceeds to step S109. At step S108, the image processing system 1 selects a side for which a provisional line has not been determined, and the processing returns to step S104.

Figure 6A:
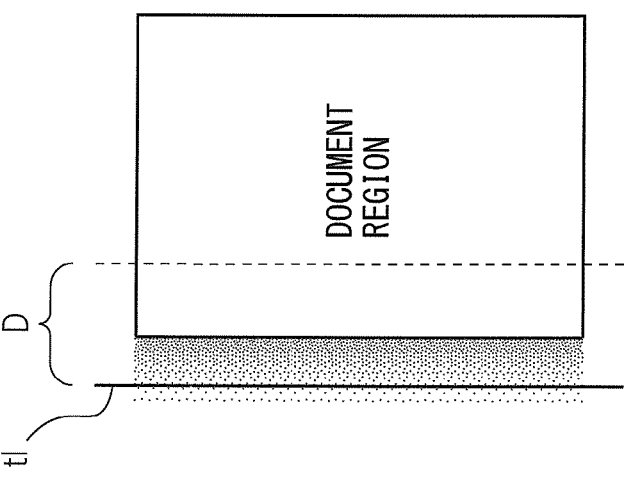
FIGS. 6A to 6C are diagrams illustrating a provisional line and a shadow image of an edge of a document.
Figure 6B:
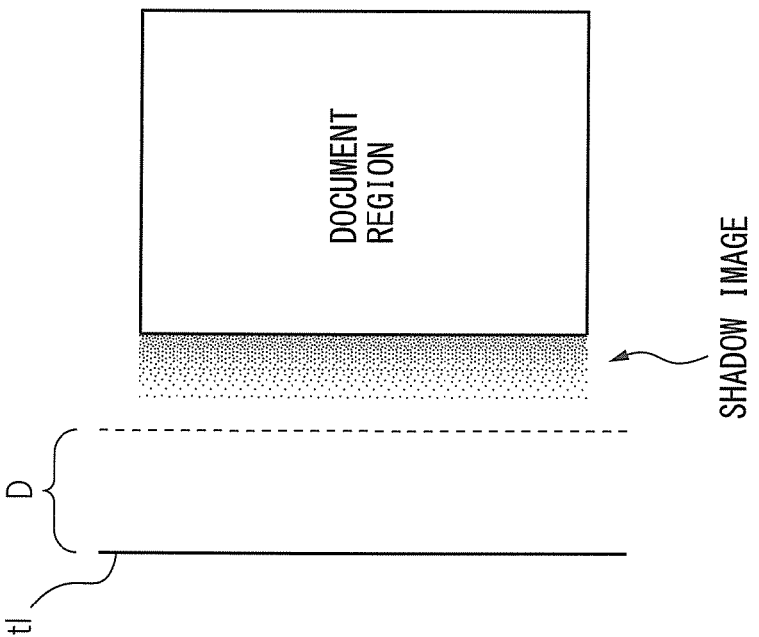
Figure 6C:
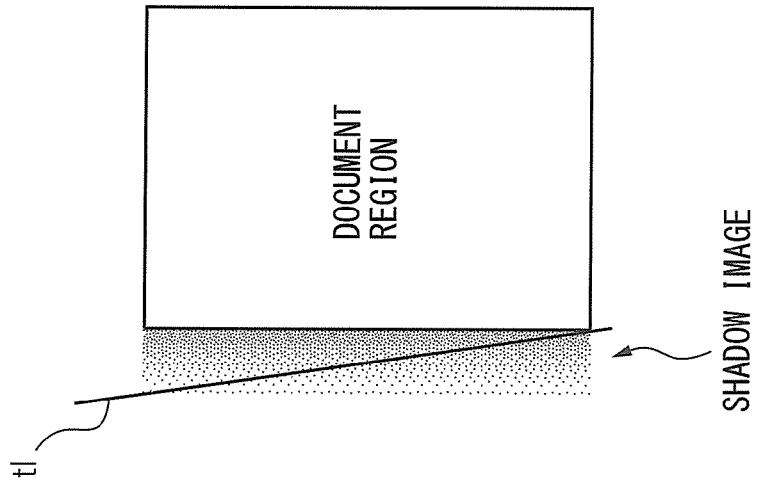

At step S109, the image processing system 1 determines whether to adopt the provisional line as a boundary line according to a detection result of a shadow image of a document edge that appears on image data. FIGS. 6A to 6C are diagrams illustrating a provisional line and a shadow image of a document edge. Since, at a document edge, a shadow of a document illuminated by an illumination source is reflected on a backing member for a document of the image reading device, image data have a shadow image on a document edge.

In the examples of FIGS. 6A to 6C, a shadow image is depicted only for the left side, but shadow images also appear on the right, the upper and the lower sides.

As illustrated in FIG. 6A, if the provisional line correctly indicates a boundary of a side of the document region, a shadow image is within a predetermined distance D from the provisional line tl; therefore, it is expected that a difference between a extension direction of line of the shadow appearing along the document edge and a direction of the provisional line is small. However, if the provisional line does not correctly indicate a boundary of a side of the document region, it is deemed that the shadow image is not within a predetermined distance D from the provisional line as is illustrated in FIG. 6B. Alternatively, it is deemed that a extension direction of line of the shadow appearing along the document edge and a direction of the provisional line are much different from what is illustrated in FIG. 6C.

The image processing system 1 determines whether to adopt the provisional line as the boundary line depending on whether the shadow image is within a predetermined distance D from the provisional line. In addition to or instead of this, the image processing system 1 determines whether to adopt the provisional line as the boundary depending on a difference between a extension direction of line of the shadow appearing along the document edge.

At step S110, the image processing system 1 determines the boundary line by correcting a position of the provisional line according to a detection position of the shadow image. At step S111, the image processing system 1 crops an image of the document region out of inputted image data by the positions of the boundary lines determined at step S110. Then, the processing is terminated.

<2.2. Configuration of Apparatus>

Figure 7:
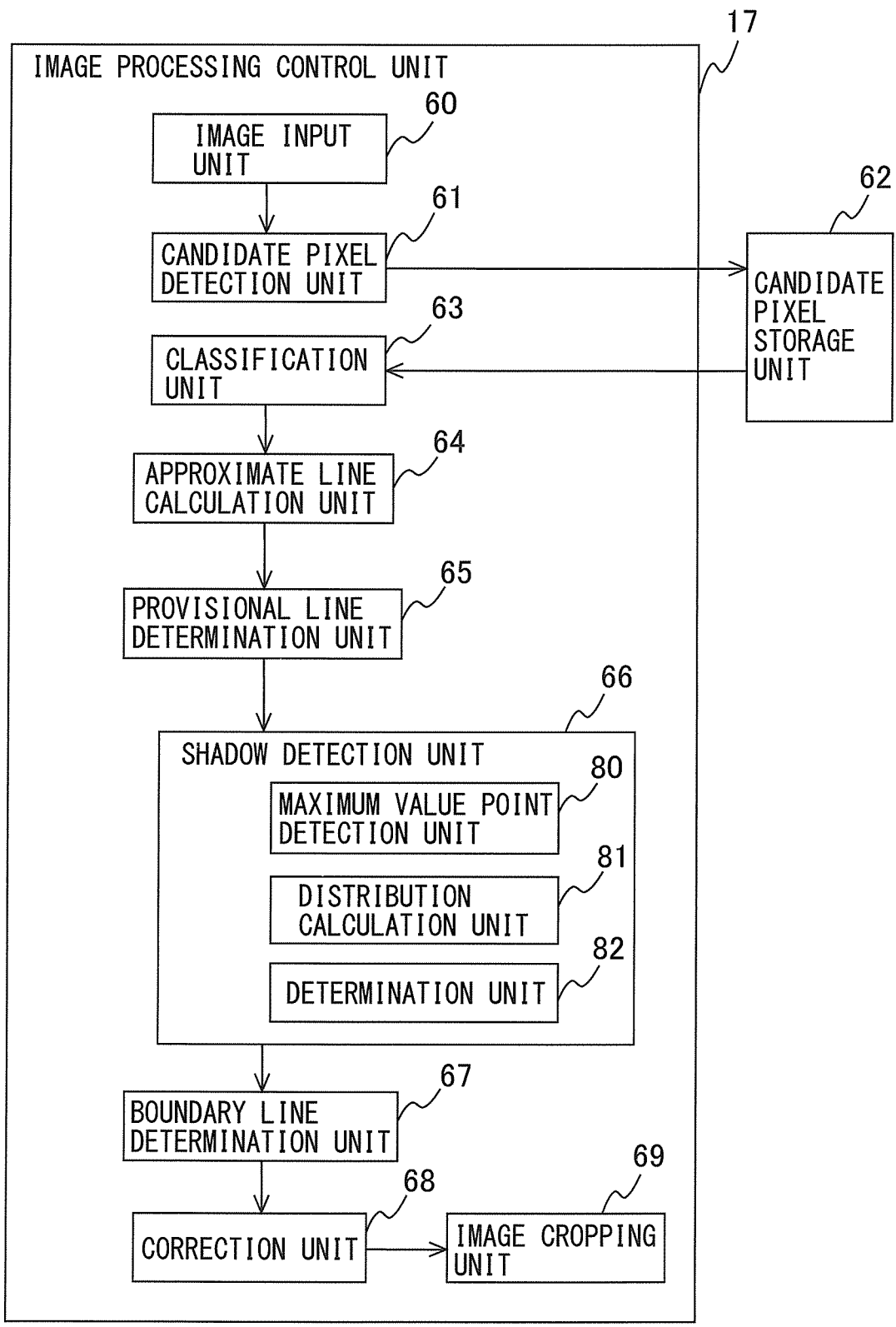
FIG. 7 is a diagram illustrating a first example of a configuration of an image processing control unit 17.

Next, the configuration of the image processing control unit 17 will be described. FIG. 7 is a diagram illustrating a first embodiment of configuration of the image processing control unit 17. The image processing control unit 17 includes an image input unit 60, a candidate pixel detection unit 61, a candidate pixel storage unit 62, a classification unit 63, an approximate line calculation unit 64, an provisional line determination unit 65, a shadow detection unit 66, a boundary line determination unit 67, a correction unit 68 and an image cropping unit 69. FIG. 7 mainly illustrates functions related to the following description. Therefore, the image processing control unit 17 may include components other than the depicted components. Candidate pixels stored in the candidate pixel storage unit 62 are stored in the memory 12.

In a variation of the present embodiment, a part or all of the processing performed by the image input unit 60, the candidate pixel detection unit 61, the classification unit 63, the approximate line calculation unit 64, the provisional line determination unit 65, the shadow detection unit 66, the boundary line determination unit 67, the correction unit 68 and the image cropping unit 69 may be performed by the CPU 11 in place of the image processing control unit 17. Alternatively, a part or all of the processing may be performed by the CPU 31 of the computer 30. The computer 30 may store candidate pixels in the memory 33 as the candidate pixel storage unit 62.

A computer program that causes the CPU 31 to perform this information processing may be recorded on a machine-readable medium and read by the medium reading unit 36 to be installed in the auxiliary storage device 32. In addition, the computer program for causing the CPU 31 to perform this information processing may be downloaded from a network via a network interface (not depicted) and installed in the auxiliary storage device 32.

The image input unit 60 takes image data 50 as input. The candidate pixel detection unit 61 detects candidate pixels for the respective sides of the document region. The candidate pixel detection unit 61 stores the detected pixels in the candidate pixel storage unit 62. The classification unit 63 classifies the candidate pixels into a plurality of different coordinate groups.

The approximate line calculation unit 64 calculates respective approximate lines for the boundary line 53 based on the candidate pixels belonging to the respective coordinate groups. The provisional line determination unit 65 generates line groups for the respective approximate lines. The provisional line determination unit 65 selects, from among the generated line groups, a line group having the largest number of candidate pixels for each of the sides of the document region, and determines a provisional line based on the selected line group.

The shadow detection unit 66 searches for a shadow image of a document edge within a predetermined distance D from the provisional line. Therefore, the shadow detection unit 66 includes a maximum value point detection unit 80, a distribution calculation unit 81 and a determination unit 82. Processing by each of the maximum value point detection unit 80, distribution calculation unit 81 and determination unit 82 will be described later.

The boundary line determination unit 67 determines, for each of the sides of the document region, whether to adopt the provisional line as a boundary line depending on whether the shadow image of a document edge is within a predetermined distance D from the provisional line. The correction unit 68 corrects a position of the provisional line adopted as the boundary line according to a detection position of the shadow image to determine the boundary line. The cropping unit 69 crops an image of the document region out of inputted image data by the positions of the boundary lines determined by the correction unit 68. The image cropped by the cropping unit 69 is outputted to the computer 30.

<2.3. Image Processing>
<2.3.1. Coordinate Group Generation Processing>

Next, processing performed by each of the components of the image processing control unit 17 will be described. In the following description, processing to determine a boundary line on the left side of the document region will be described as an example. A boundary line can be determined similarly for the right side. By changing a direction for scanning candidate pixels in generating coordinate groups by 90°, a boundary line can be determined similarly for the upper and the lower sides.

Figure 8:
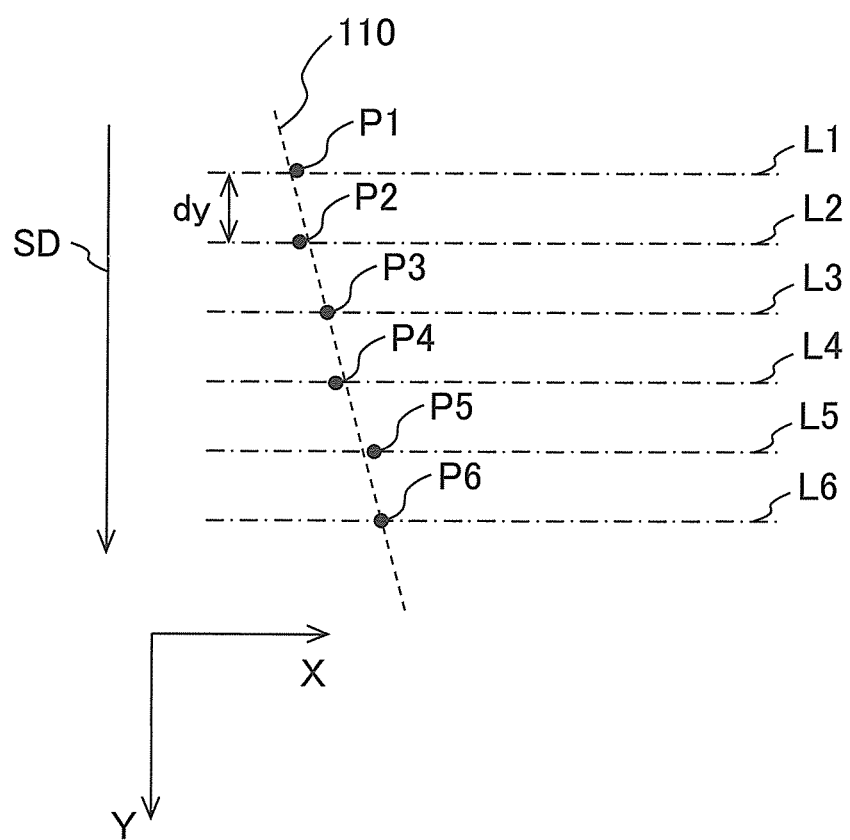
FIG. 8 is a diagram illustrating candidate pixels detected by a candidate pixel detection unit 61.

The classification unit 63 classifies candidate pixels detected by the candidate pixel detection unit 61 into a plurality of different groups to generate coordinate groups. The FIG. 8 is a diagram illustrating candidate pixels detected by the candidate pixel detection unit 61. The candidate pixel detection unit 61 detects candidate pixels P1 to P6, . . . for a boundary line 110 on detection lines L1 to L6, . . . . The detection lines L1 to L6, . . . are arranged in a scanning direction SD from the upper portion to lower portion of image data at every predetermined number of pixels dy.

In the following description, a direction from the upper portion to lower portion of image data may be denoted as Y-axis direction, and a direction from the left portion to right portion may be denoted as X-axis direction. Coordinates of a point in X-axis direction and in Y-axis direction may be denoted as X-coordinate and Y-coordinate, respectively.

The classification unit 63 successively changes a candidate pixel focused to be processed (hereinafter denoted as "focused candidate pixel") in the scanning direction SD to a continuing candidate pixels P1, P2, . . . , P(i−1), Pi, P(i+1), . . . . In other words, the classification unit 63 scans the focused candidate pixels in the scanning direction SD. While the classification unit 63 successively changes the focused candidate pixels, the classification unit 63 determines whether or not each of the focused candidate pixels is to be classified into the same coordinate group as a candidate pixel on the detection line immediately above.

Figure 9:
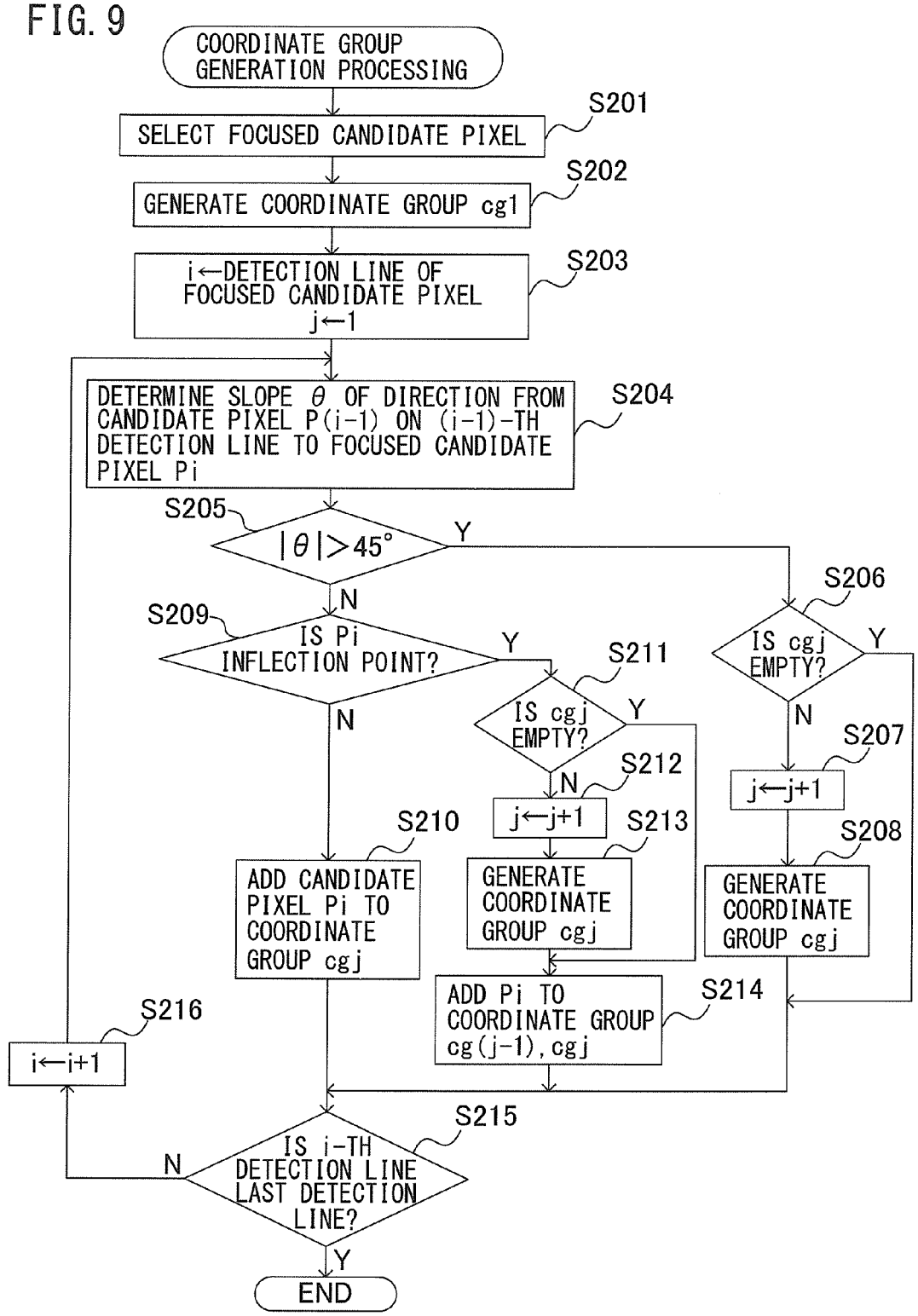
FIG. 9 is a diagram illustrating one example of coordinate group generation processing.

FIG. 9 is a diagram illustrating one example of coordinate group generation processing. The coordinate group generation processing in FIG. 9 corresponds to the coordinate group generation processing at step S104 in FIG. 3. At step S201, the classification unit 63 selects the first focused candidate pixel to be processed. For example, the classification unit 63 may select the second or lower candidate pixel from the top as the first focused candidate pixel. This is for determining positional relation between the focused candidate pixel and a candidate pixel detected on the detection line immediately above at steps S205 and S206 that will be described later.

At step S202, the classification unit 63 generates a first coordinate group cg1. At step S203, the classification unit 63 substitutes the number of the detection line of the focused candidate pixel selected at step S201 into the variable "i" indicating a detection line of a focused candidate pixel. The classification unit 63 substitutes "1" into the index "j" referring to a coordinate group cgj being formed at present.

Figure 10A:
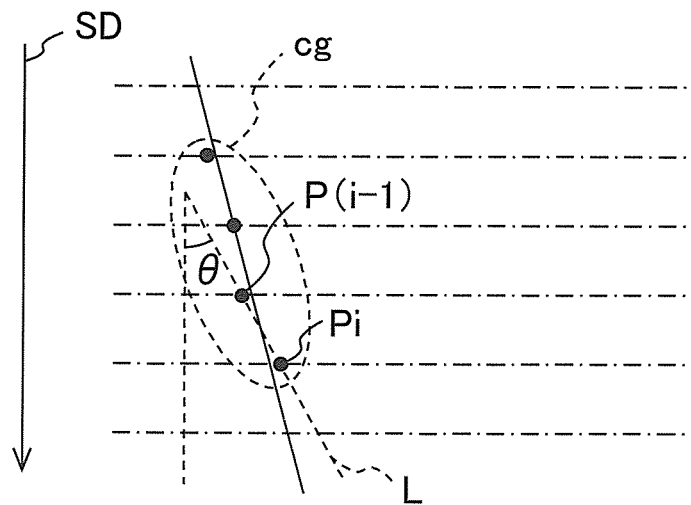
FIGS. 10A and 10B are diagrams illustrating coordinate group generation processing.
Figure 10B:
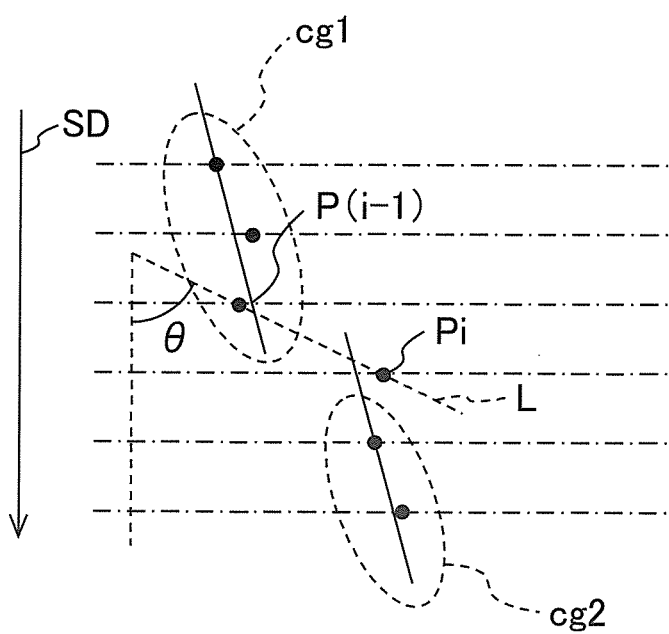

At step S204, the classification unit 63 determines a slope θ of direction from a candidate pixel P(i−1) on the (i−1)-th detection line to a focused candidate pixel Pi. Referring to FIG. 10A, the slope θ of direction from of direction from the candidate pixel P(i−1) to the candidate pixel Pi will be described. In FIGS. 10A and 10B, a dashed-dotted line indicates a detection line.

The slope θ is defined as the angle between the scanning direction SD and a line L connecting the candidate pixel P(i−1) and the candidate pixel Pi. Here, it is supposed that a document is read in a state inclined relative to the image sensor 13 of the image reading device 10 up to the maximum angle of 45°. Thus, a line connecting candidate pixels on one boundary line is supposed to be inclined up to the maximum angle of 45°. If a line connecting candidate pixels is inclined greater than 45°, it is determined that these candidates are not on one boundary line.

Therefore, at step S205, the classification unit 63 determines whether the slope θ is greater than 45°. If the slope θ is 45° or smaller than 45°, as depicted in FIG. 10A, the focused candidate pixel Pi is included in the same coordinate group cg as the candidate pixel P(i−1) on the detection line immediately above. On the other hand, if the slope θ is greater than 45°, as depicted in FIG. 10B, the focused candidate pixel Pi is not included in the same coordinate group cg1 as the candidate pixel P(i−1) on the detection line immediately above. Since a distance in Y-axis direction between detection lines is a constant value dy, the classification unit 63 may determine whether the slope θ is greater than 45° depending on whether a difference in X-coordinates between the candidate pixels exceeds dy.

Referring to FIG. 9, if the slope θ is greater than 45° (step S205: Y), the processing proceeds to operation S206. If the slope θ is 45° or smaller than 45° (step S205: N), the processing proceeds to operation S209. At step S206, the classification unit 63 determines whether the coordinate group cgj being formed at present is empty. If cgj is empty (step S206: Y), the classification unit 63 does not generate a new coordinate group, and the processing proceeds to step S215. If cgj is not empty (step S206: N), the classification unit 63 increments the index j by 1 at step S207, and generates a new coordinate group cgj at step S208. Thereafter, the processing proceeds to step S215.

In this embodiment, the focused candidate pixel Pi is not included in the coordinate group cgj newly generated at step S208. Therefore, when the slope θ is greater than 45° as depicted in FIG. 10B, the focused candidate pixel Pi does not belong to a new coordinate group cg2, nor to the coordinate group cg1 to which the candidate pixel P(i−1) belongs. In a variation of the embodiment, the classification unit 63 may classify the focused candidate pixel Pi into the new coordinate group generated at step S208.

As a case in which the slope θ of a line connecting adjoining candidate pixels exceeds 45°, the following two cases, for example, can be supposed.

Figure 11A:
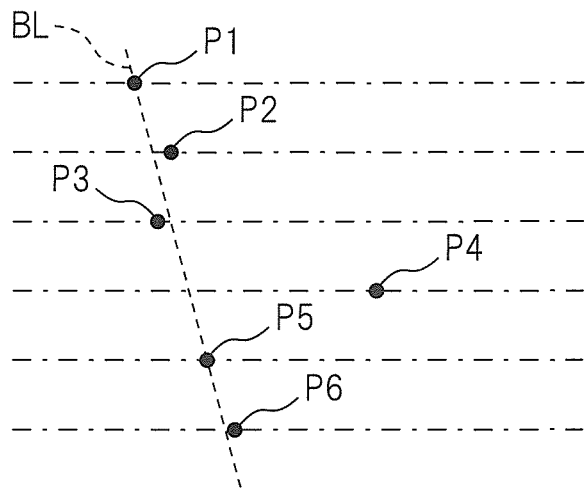
FIGS. 11A to 11C are diagrams illustrating a case in which a slope θ of a line connecting candidate pixels exceeds 45°.

(1) A case where a candidate pixel is incorrectly detected due to noise: In this case, the incorrectly detected candidate pixel is detected at a position distant from the proper boundary line. In the example depicted in FIG. 11A, among candidate pixels P1 to P6, the candidate pixel P4 is detected at a position distant from the proper boundary line BL.

Figure 11B:
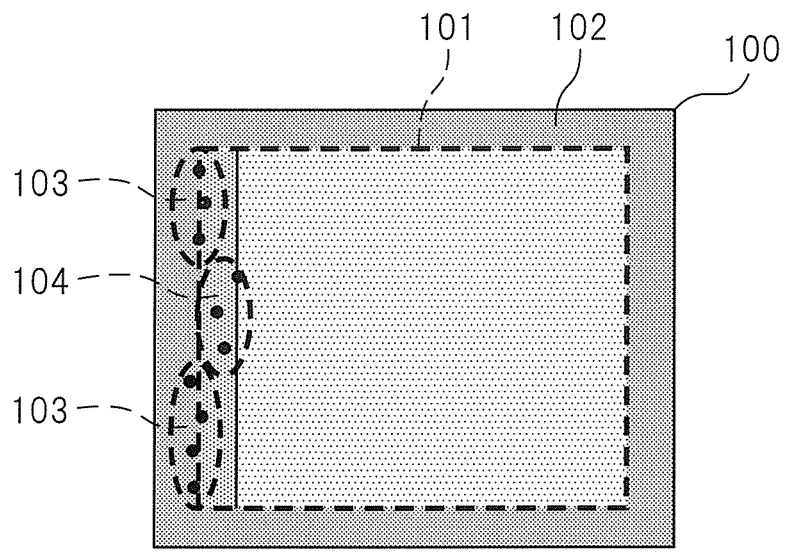

As an example of occurrence of such incorrect detection, a case where a brightness difference between the document region and the background region in image data is small can be mentioned. FIG. 11B is a schematic diagram illustrating image data in which a brightness difference between the document region and the background region is small. Image data 100 include a document region 101 and a background region 102, and a brightness difference between the document region 101 and the background region 102 is relatively small. In such a case, it is difficult to distinguish the brightness change in the boundary between the document region 101 and the background region 102 from the brightness change in the document region 101. Therefore, as depicted in FIG. 11B, for example, while a candidate pixel is detected normally at a position of the boundary line in the portion denoted by reference numeral 103, a candidate pixel may be incorrectly detected at a position distant from the boundary line in the portion denoted by reference numeral 104.

If an incorrectly detected candidate pixel is used when calculating an approximate line for a boundary line, it may cause an error in the slope of the approximate line. The classification unit 63 does not include the incorrectly detected candidate pixel in the same coordinate group as other candidate pixels, which prevents the slope of the approximate line calculated based on the candidate pixels belonging to the coordinate group from having an error caused by the incorrectly detected candidate pixel.

Figure 11C:
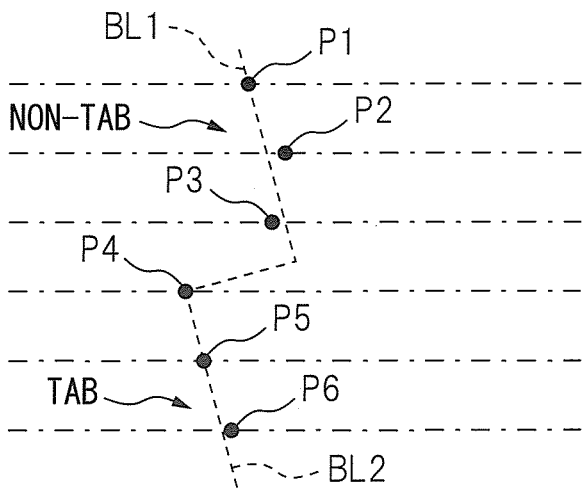

(2) A case where there is a tab on a side, and one candidate pixel is detected at the tab portion and the other candidate pixel is detected at a non-tab portion. In this case, these candidate pixels are not on the same boundary line. FIG. 11C is a schematic diagram illustrating candidate pixels detected at the tab portion and at the non-tab portion. While the candidate pixels P1 to P3 are detected on a boundary line BL1 of the non-tab portion, the candidate pixels P4 to P6 are detected on a boundary line BL2 of the tab portion.

Since the candidate pixels PI to P6 are not detected on the same line, the slope of an approximate line calculated for the boundary line based on these candidate pixels gives rise to an error. The classification unit 63 does not include the candidate pixels detected in the tab portion and the candidate pixels detected in the non-tab portion in the same coordinate group, which prevents an error of the slope of the approximate line due to calculation by mixing these candidate pixels in one group.

Referring to FIG. 9, at step S209, the classification unit 63 determines whether or not the focused candidate pixel Pi is an inflection point of the boundary line. In other words, the classification unit 63 determines whether the boundary line inflects before and after the focused candidate pixel Pi.

Figure 12A:
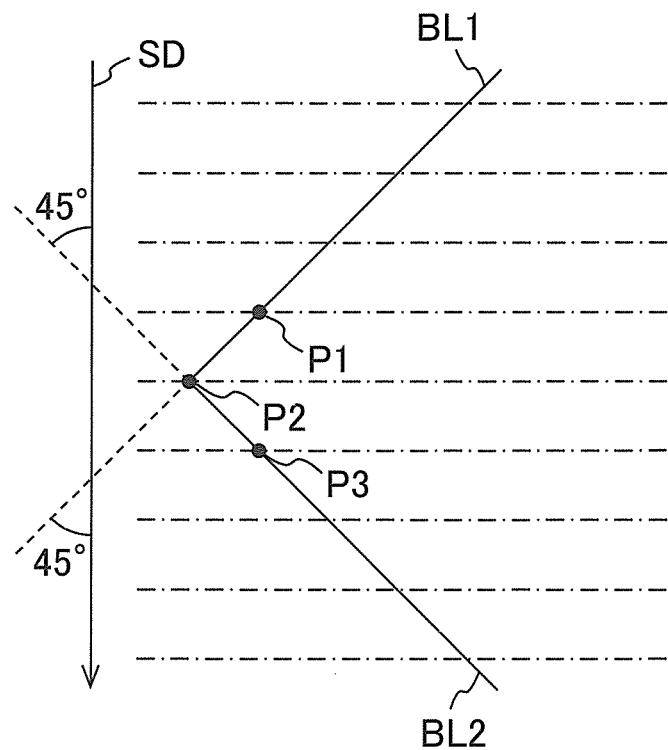
FIGS. 12A and 12B are diagrams illustrating a state of candidate pixels when a document is read with an inclination of 45° relative to an image scanner.

As described above, the document may be read in an inclined state relative to the image sensor 13 of the image reading device 10 at 45° in the maximum. FIG. 12A illustrates the state of a candidate pixel when the document is read in an inclined state at 45° in the maximum. The point P1 is a candidate pixel detected on the boundary line BL1 on any one of the sides of the document. The point P3 is a candidate pixel detected on the boundary line BL2 on another side of the document. The candidate pixel P2 is a candidate pixel detected at the corner where the boundary lines BL1 and BL2 intersect with each other.

The slope of the line from the candidate pixels P1 to P2 is 45°. Thus, if a focused candidate pixel is P2, the determination at step S205 is "No (N)", and the classification unit 63 does not separate the candidate pixels P1 and P2 into different coordinate groups. Since the slope of the line from the candidate pixels P2 to P3 is also 45°, if a focused candidate pixel is P3, from the determination at step S205, the classification unit 63 does not separate the candidate pixels P2 and P3 into different coordinate groups. Therefore, from the determination at step S205, the classification unit 63 does not separate the candidate pixels P1 and P3 into different coordinate groups.

Since the candidate pixels P1 and P3 are not detected on the same line, if an approximate line for the boundary line is calculated based on these candidate pixels, the slope of the approximate line may have an error. Accordingly, the classification unit 63 determines whether a focused candidate pixel Pi is an inflection point of the boundary line, and separates coordinate groups before and after the inflection point.

Figure 12B:
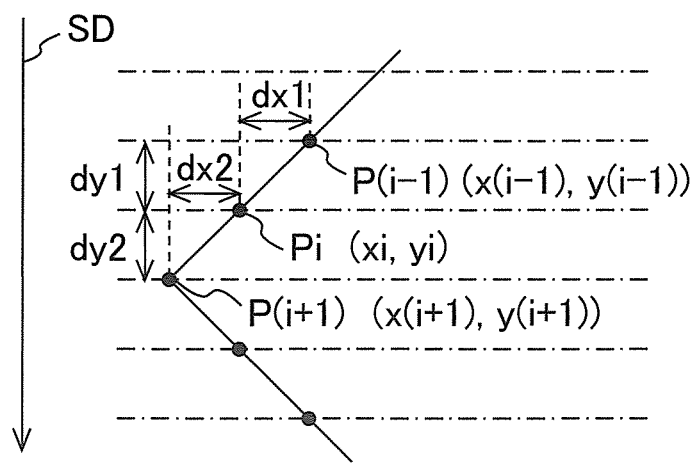

FIG. 12B is a diagram illustrating one example of a method of detecting an inflection point. The points Pi, P(i−1), and P(i+1) are an focused candidate pixel, a candidate pixel on the detection line immediately above the focused candidate pixel, and a candidate pixel on the detection line immediately below the focused candidate pixel, respectively. Let the coordinate of the focused candidate pixel Pi be (xi, yi), the coordinate of the candidate pixel P(i−1) be (x(i−1), y(i−1)), and the coordinate of the candidate pixel P(i+1) be (x(i+1), y(i+1)).

The classification unit 63 calculates a second order differential value A of a trajectory of a candidate pixel in accordance with the following equation (1).

$$A=(dx2/dy2)-(dx1/dy1) \quad (1)$$

$$dx1=xi-x(i-1), dy1=yi-y(i-1)$$

$$dx2=x(i+1)-xi, dy2=y(i+1)-yi$$

If a focused candidate pixel is not an inflection point, the slopes of the boundary lines dx1/dy1, dx2/dy2 are constant, and therefore the absolute value |A| of the second order differential value A is relatively small. If a focused candidate pixel is an inflection point, the absolute value |A| is relatively large. The classification unit 63 determines whether a focused candidate pixel is an inflection point by determining whether the absolute value |A| is larger than a predetermined threshold value Th1.

Here, the first term on the right side of the equation (1), (dx2/dy2), corresponds to the slope of a line connecting the focused candidate pixel Pi and the candidate pixel P(i+1), that is, a direction of the line. The second term on the right side of the equation (1), (dx1/dy1), corresponds to a direction of a line connecting the candidate pixel P(i−1) and the focused candidate pixel Pi. Therefore, the absolute value |A| of the second order differential value A corresponds to an amount of change between the direction of the line connecting the candidate pixels P(i−1) and Pi and the line connecting the candidate pixels Pi and P(i+1). The predetermined threshold value Th1 is one example of a second threshold value.

Referring to FIG. 9 and FIGS. 13A to 13C, processing to divide coordinate groups before and after an inflection point will be described. If a focused candidate pixel Pi is not an inflection point (step S209: N), the processing proceeds to step S210. At step S210, the classification unit 63 adds the focused candidate pixel Pi to a coordinate group cg1 being formed. Thereafter, the processing proceeds to step S215.

Figure 13A:
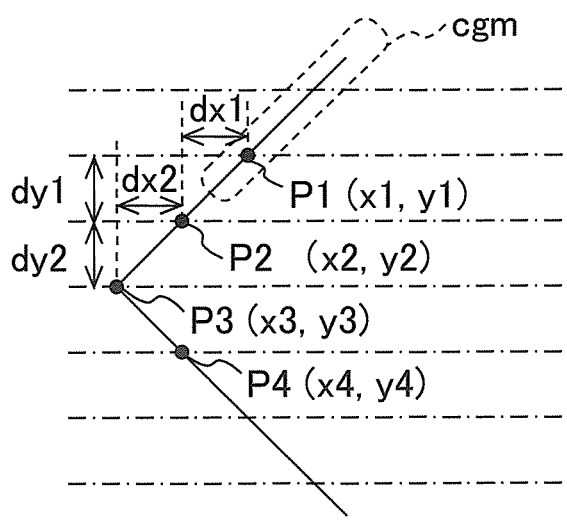
FIGS. 13A to 13C are diagrams illustrating processing when a document is read with an inclination of 45° relative to an image scanner.

FIG. 13A depicts a state before an inflection point is detected. The points P1 to P4 are candidate pixels detected at a corner of the document. Coordinates of the candidate pixels P1 to P4 are (x1, y1), (x2, y2), (x3, y3) and (x4, y4), respectively. At present, a focused candidate pixel P1 is P2, and the candidate pixel P1 on the detection line immediately above P2 belongs to the coordinate group cgm. Since the focused candidate pixel P2 is not an inflection point, the absolute value |A| of the second order differential calculated in the following equation is relatively small and does not exceed the detection threshold value Th1 of an inflection point.

$$|A|=|(x3-x2)/(y3-y2)-(x2-x1)/(y2-y1)|$$

As a result, the processing proceeds to step S210. At step S210, the focused candidate pixel P2 is added to the coordinate group cgm.

Figure 13B:
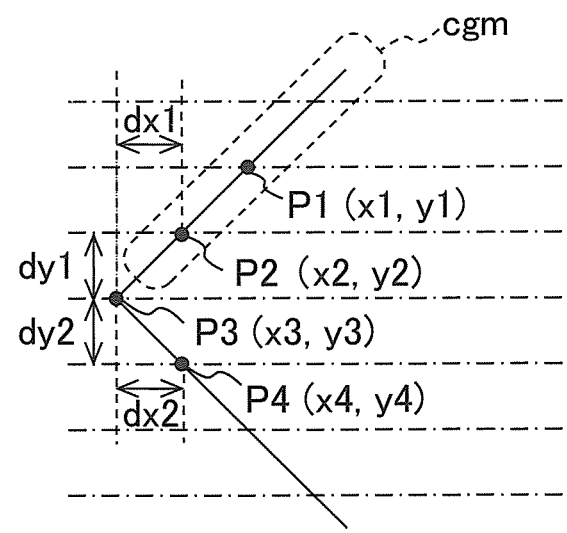

Then, a focused candidate pixel Pi is changed from the candidate pixel P2 to P3. FIG. 13B is a diagram illustrating a second order differential when a focused candidate pixel Pi is the candidate pixel P3. Since the focused candidate pixel P3 is an inflection point, the absolute value |A| of the second order differential calculated in the following equation is relatively large and exceeds the detection threshold value Th1 of an inflection point.

$$|A|=|(x4-x3)/(y4-y3)-(x3-x2)/(y3-y2)|$$

In FIG. 9, if a focused candidate pixel Pi is an inflection point (step S209: Y), the processing proceeds to step S211. At step S211, the classification unit 63 determines whether the coordinate group cgj being formed at present is empty. If cgj is empty (step S211: Y), the classification unit 63 does not generate a new coordinate group, and the processing proceeds to step S214. If cgj is not empty (step S211: N), the classification unit 63 increments the index j by 1 at step S212, and generates a new coordinate group cgj at step S213. At step S214, the classification unit 63 adds the candidate pixel Pi at the inflection point to both coordinate groups cg(j−1) and cgj before and after the inflection point. Thereafter, the processing proceeds to step S215.

Figure 13C:
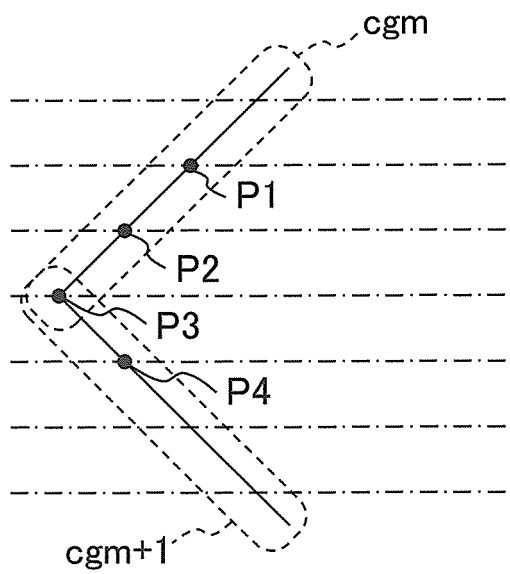

FIG. 13C is a diagram illustrating a state in which the inflection point P3 is detected so that a new coordinate group is generated in addition to the coordinate group cgm. In FIG. 13C, the candidate pixel P3 at the inflection point is added to both coordinate groups cgm and cgm+1.

Referring to FIG. 9, at step S215, the classification unit 63 determines whether the detection line of a focused candidate pixel Pi is the last detection line. If the detection line of the focused candidate pixel Pi is the last detection line (step S215: Y), the processing is terminated. If the detection line of the focused candidate pixel Pi is not the last detection line (step S215: N), the processing proceeds to step S216. At step S216, the classification unit 63 changes a focused candidate pixel Pi to a candidate pixel on the next detection line, and the processing returns to step S204.

<2.3.2. Line Group Generation Processing>

Figure 14:
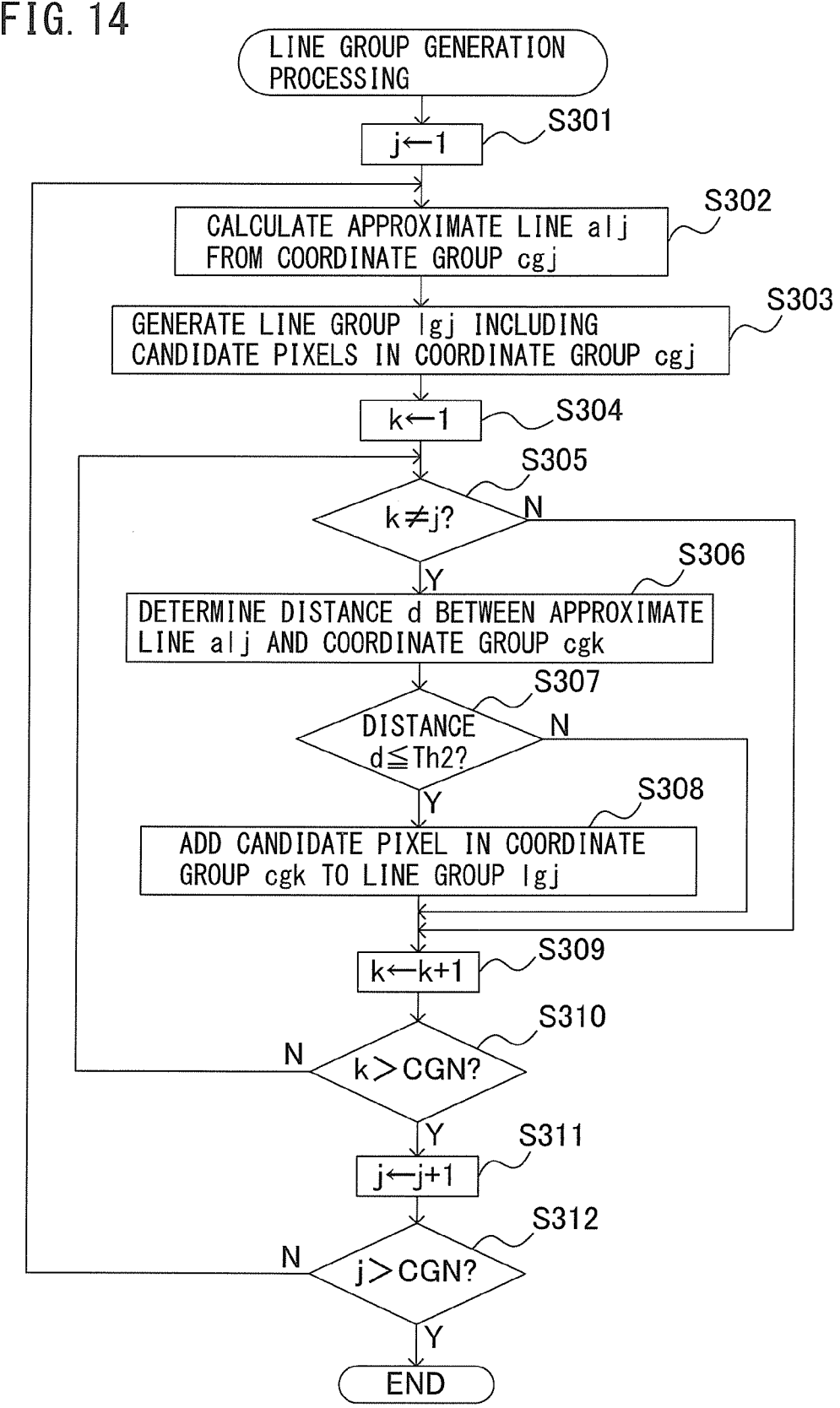
FIG. 14 is a diagram illustrating line group generation processing.

FIG. 14 is a diagram illustrating line group generation processing. The line group generation processing in FIG. 14 corresponds to the line group generation processing at S105 in FIG. 3. At step S301, the approximate line calculation unit 64 substitutes "1" into the index "j" referring to a coordinate group cgj focused to be processed. Hereinafter, the pixel group cgj may be denoted as "a focused coordinate group cgj." At step S302, the approximate line calculation unit 64 calculates an approximate line alj for the boundary line 53 on the basis of candidate pixels belonging to a focused coordinate group cgj. At step S303, the provisional line determination unit 65 generates a line group lgj including the candidate pixels belonging to the focused coordinate group cgj.

At step S304, the provisional line determination unit 65 substitutes "1" into the index "k" referring to the coordinate group. At step S305, the provisional line determination unit 65 determines whether the coordinate group cgk is different from the focused coordinate group cgj. If the coordinate group cgk is different from the focused coordinate group cgj (step S305: Y), the processing proceeds to step S306. If the coordinate group cgk is the same as the focused coordinate group cgj (step S305: N), steps S306 to S308 are skipped, and the processing proceeds to step S309.

Figure 15A:
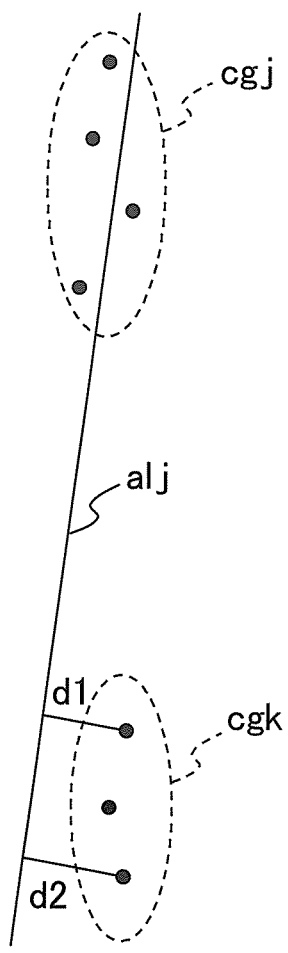
FIGS. 15A and 15B are diagrams illustrating a line group.

At step S306, the provisional line determination unit 65 determines a distance d between the approximate line alj and the coordinate group cgk. Various calculation methods can be used to calculate the distance d. FIG. 15A is a diagram illustrating an exemplary method for calculating the distance d between the approximate line alj and the coordinate group cgk. The provisional line determination unit 65 may calculate an average of distances d1 and d2 from points at both ends of the coordinate group cgk to the approximate line alj as the distance d. The provisional line determination unit 65 may calculate either of a longer one or a shorter one of d1 and d2 as the distance d. The provisional line determination unit 65 may calculate a distance between any one of candidate pixels included in the coordinate group cgk and the approximate line alj as the distance d.

Figure 15B:
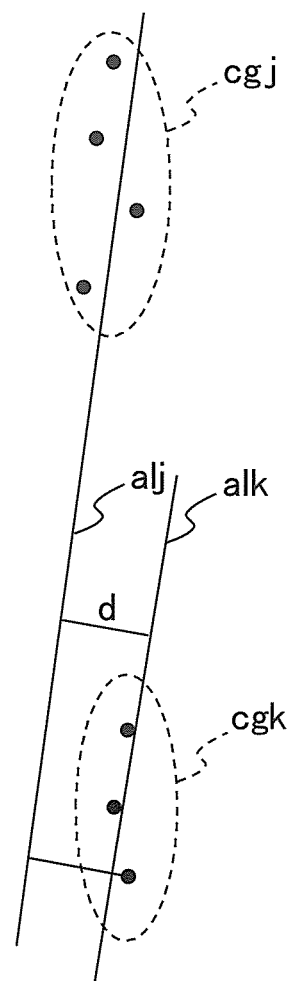

FIG. 15B is another diagram illustrating the exemplary method for calculating the distance d between the approximate line alj and the coordinate group cgk. The provisional line determination unit 65 may calculate a distance between the approximate line alk calculated on the basis of the coordinate group cgk and the approximate line alj as the distance d.

At step S307, the provisional line determination unit 65 determines whether the distance d is equal to or less than a predetermined threshold value Th2. If the distance d is equal to or less than the threshold value Th2 (step S307: Y), the processing proceeds to step S308. If the distance d exceeds the threshold value Th2 (step S307: N), step S308 is skipped, and the processing proceeds to step S309. At step S308 the provisional line determination unit 65 adds the candidate pixels of the coordinate group cgk to the line group lgj.

At step S309, the provisional line determination unit 65 increments the value of the index k by 1. At step S310, the provisional line determination unit 65 determines whether the value of the index k exceeds the total number of coordinate groups CGN. If the value of k exceeds CGN (step S310: Y), the processing proceeds to step S311. If the value of k does not exceed CGN (step S310: N), the processing returns to step S305.

At step S311, the provisional line determination unit 65 increments the value of the index j of the focused coordinate group cgj by 1. At step S312, the provisional line determination unit 65 determines whether the value of the index j exceeds the total number of coordinate groups CGN. If the value of j exceeds CGN (step S312: Y), the processing is terminated. If the value of j does not exceed CGN (step S312: N), the processing returns to step S302.

Figure 16:
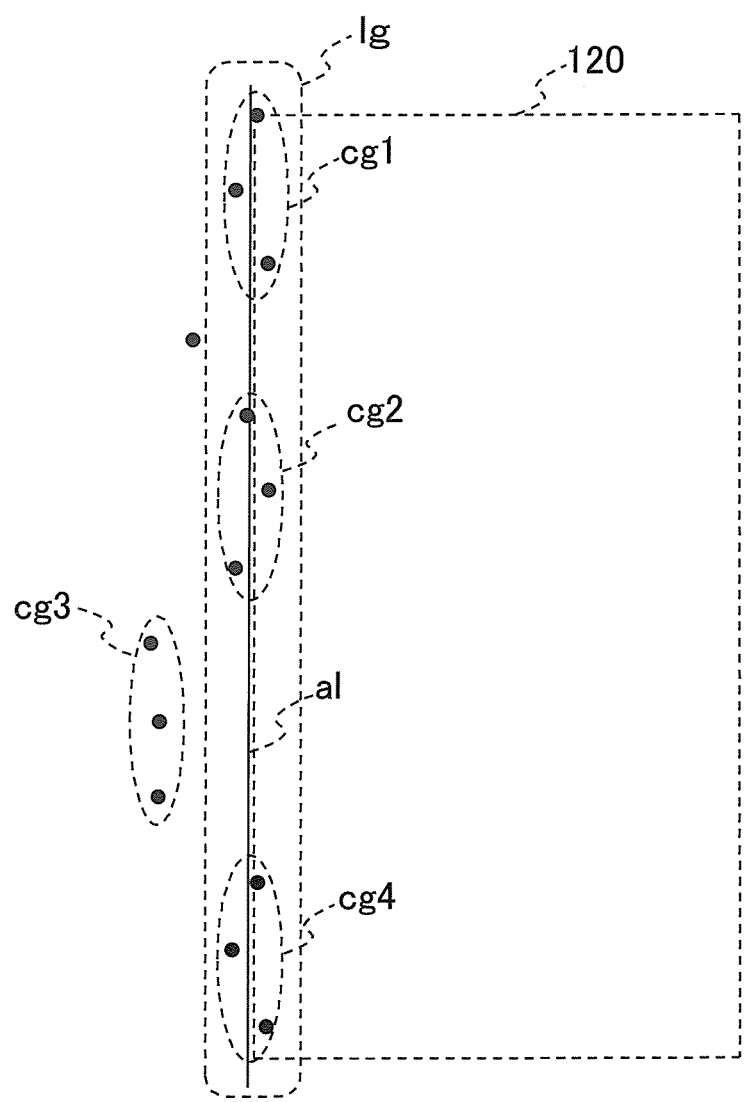
FIG. 16 is a diagram illustrating a line group.

The line group lgj formed at the above steps S301 to S312 will be described. FIG. 16 is a diagram illustrating a line group. In FIG. 16, the dotted line 120 denotes the document region, and the black dots indicate candidate pixels. In the example depicted in FIG. 16, a plurality of coordinate groups cg1 to cg4 are formed, and the approximate line a1 is an approximate line of the boundary line of the document region calculated based on the coordinate group cg1. The line group lg is a set of candidate pixels of the coordinate groups cg1, cg2, and cg4 that are within a predetermined distance from the approximate line alj.

The line group lg includes not only candidate pixels belonging to one coordinate group cg1, but also candidate pixels of other coordinate groups cg2 and cg4 within a predetermined distance from the approximate line al of the boundary line calculated based on candidate pixels included in the line group lg. Therefore, the provisional line determination unit 65 identifies those candidate pixels that are detected as positioned on the same line and yet are classified into different coordinate groups, as one set.

<2.3.3. Provisional Line Determination Processing>

Figure 17:
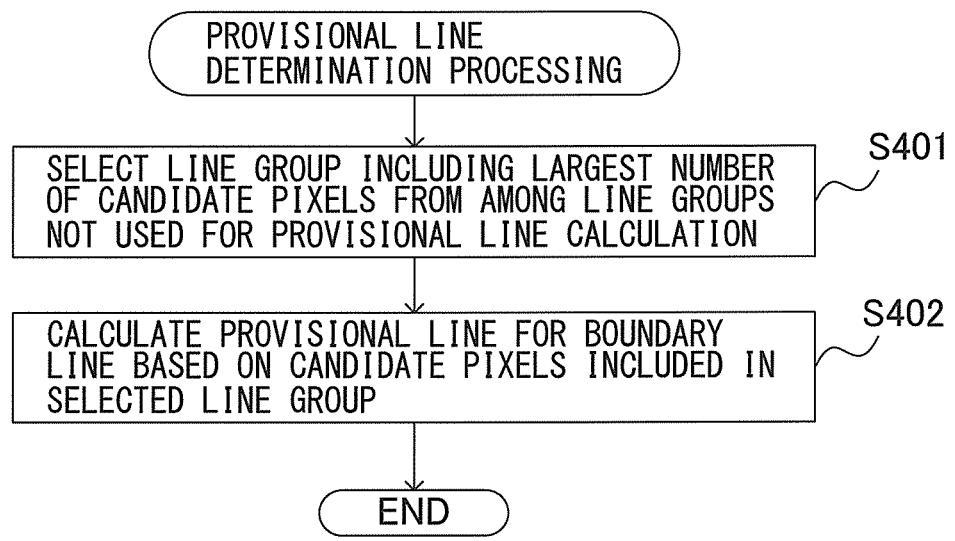
FIG. 17 is a diagram illustrating one example of provisional line determination processing.

FIG. 17 is a diagram illustrating one example of provisional line determination processing. The provisional line determination processing in FIG. 17 corresponds to the provisional line determination processing at S106 in FIG. 3. At step S401, the provisional line determination unit 65 selects a line group from among generated line groups. At step S402, the provisional line determination unit 65 calculates a provisional line of the boundary line of the document region based on the candidate pixels included in the line group selected at step S401.

As will be described later, if the boundary line determination unit 67 does not adopt the provisional line determined by the provisional line determination unit 65 as the boundary line of the side of the document region, the provisional line determination unit 65 performs the provisional line determination processing again to determine another provisional line. At Step S401, the provisional line determination unit 65 selects a line group including the largest number of candidate pixels from among line groups other than the line group that has already used for calculation of the provisional line determination processing.

<2.3.4. Adoption Determination Processing>

Figure 18:
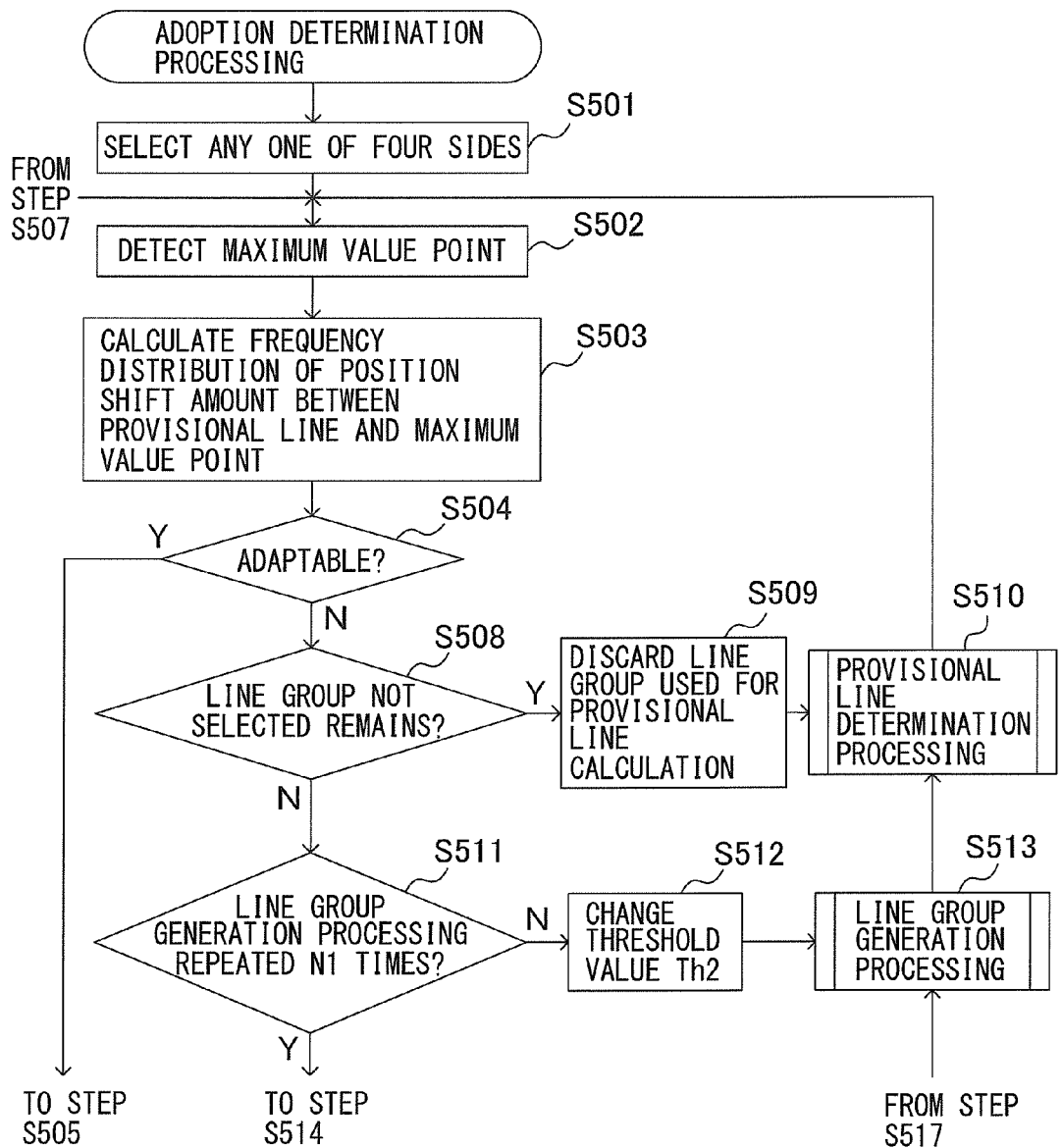
FIG. 18 is a diagram illustrating one example of adoption determination processing.
Figure 19:
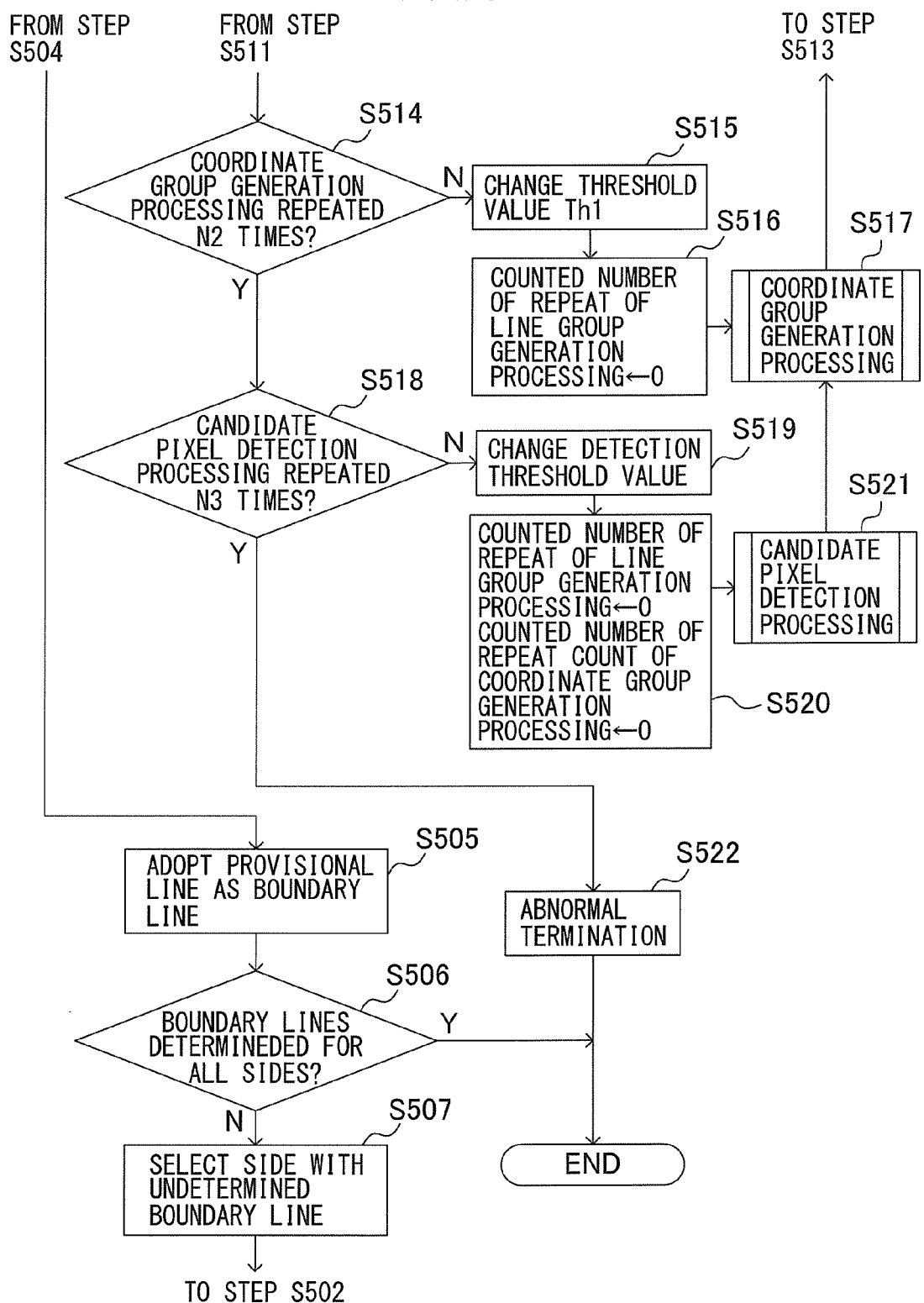
FIG. 19 is a diagram illustrating one example of adoption determination processing.

FIGS. 18 and 19 are diagrams illustrating one example of adoption determination processing. The adoption determination processing in FIGS. 18 and 19 corresponds to the adoption determination processing at S109 in FIG. 3. At Step S501 the shadow detection unit 66 selects any one of the sides of the document region. The following steps S502 to S505 and S508 to S522 are performed for each of the sides of the document region.

At Step S502, the maximum value point detection unit 80 detects, at every plurality of coordinates on the provisional line, a point at which an absolute value of differential of brightness of a pixel along a first direction from each coordinates toward inside of the document region is maximum within a predetermined distance from each coordinates. In the following description and in the accompanying drawings, the points may be denoted as "a maximum value point."

Figure 20A:
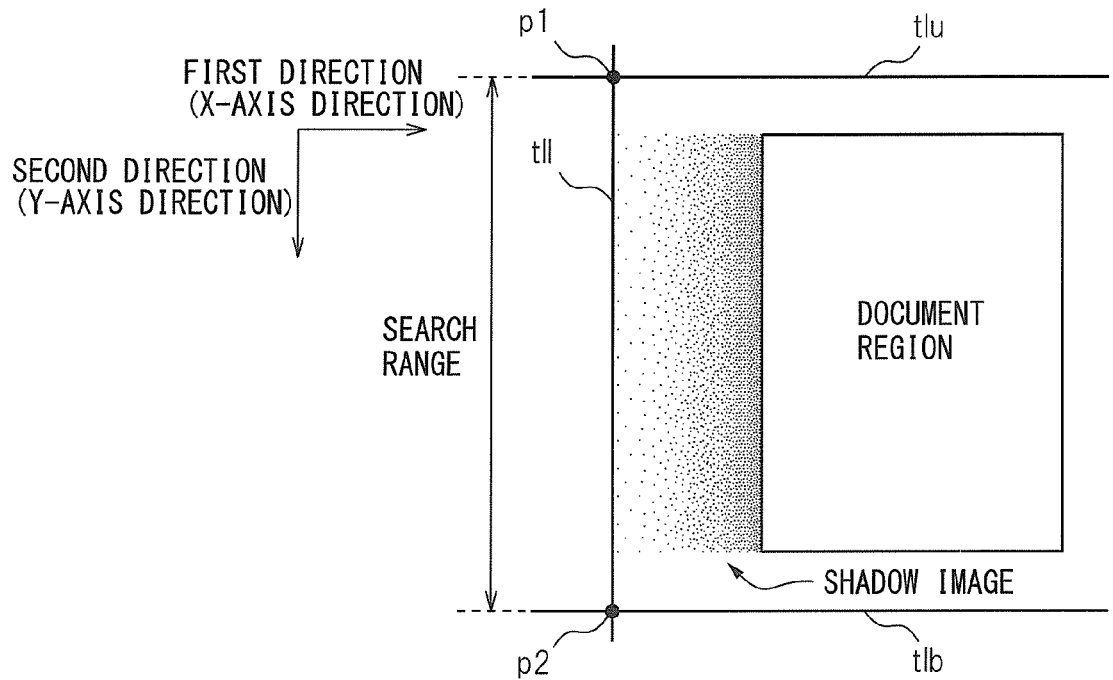
FIGS. 20A and 20B are diagrams illustrating maximum value point detection processing.
Figure 20B:
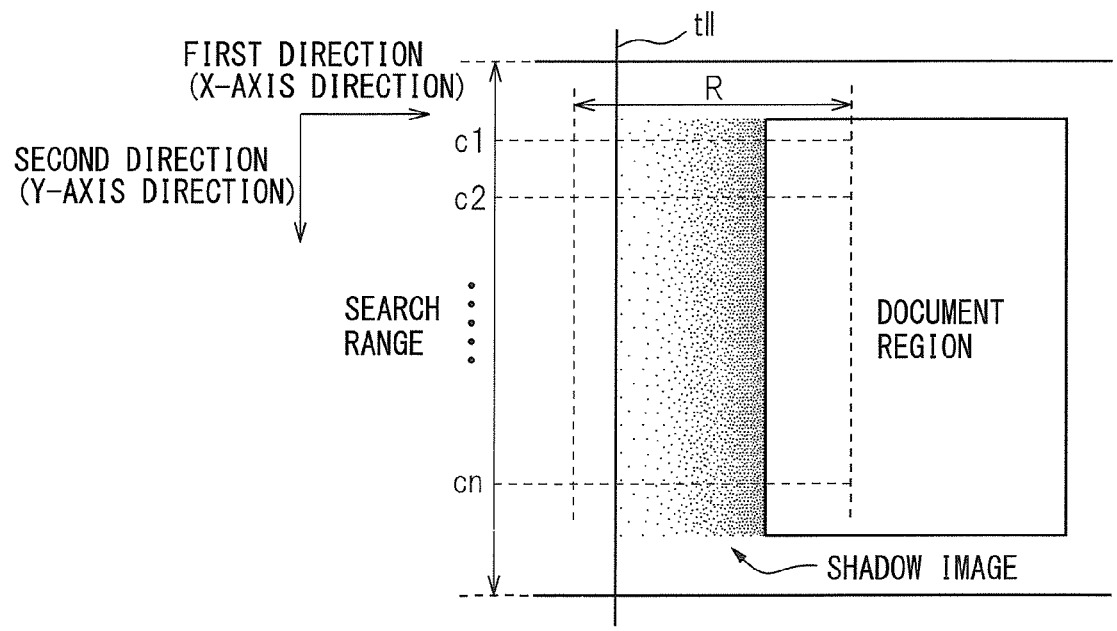

FIGS. 20A and 20B are diagrams illustrating maximum value point detection processing. If the provisional line is a provisional line on the left side or right side of the document region, one example of the first direction and a second direction that is perpendicular to the first direction are X-axis direction and Y-axis direction, respectively. If a provisional line is a provisional line on the upper side or the lower side of the document region, one example of the first direction and second direction are Y-axis direction and X-axis direction, respectively.

The maximum value point detection unit 80 determines a range of pixels in the second direction to search for maximum value points. In the following description and in the accompanying drawings, the range of pixels in the second direction to search for maximum value points may be denoted as a "search range." For example, the maximum value point detection unit 80 may determine a range surrounded by intersection points of provisional lines that the provisional line determination unit 65 determined for four sides of the document region, as the search range. In the example in FIG. 20A, the search range for searching for maximum value points regarding a provisional line tll on the left side is a range between an intersection point P1 of the provisional line tll and a provisional line tlu on the upper side and an intersection point p2 of the provisional line tll and a provisional line tlb on the lower side.

The maximum value point detection unit 80 searches for a maximum value point at every plurality of coordinates in the second direction within the search range. In the example in FIG. 20B, the maximum value point detection unit 80 detects respective maximum value points for respective coordinates c1, c2, ... cn in the second direction. The range R is a range of pixels in the first direction for searching maximum value points. In the following description and the accompanying drawings, the range of pixels in the first direction for searching for maximum value points may be denoted as "a focused range."

The focused range may also include a range outside the provisional line tll. For example, in an embodiment, the focused range is a range of 64 pixels between the coordinates at one pixel outward from the provisional line tll and the coordinates at 62 pixels inward from the provisional line tll. The maximum value point detection unit 80 calculates a differential value of brightness of a pixel in the first direction within the focused range, at every plurality of coordinates c1, c2, ... cn within the search range.

For example, the maximum value point detection unit 80 may calculate a brightness difference between adjacent pixels in the first direction, as the differential value. The maximum value point detection unit 80 may average brightness of a plurality of pixels arranged along the second direction and calculate a differential value of the averaged brightness.

FIG. 21A is a graph illustrating brightness change in the first direction of pixels in image data. FIG. 21A is an example of image data acquired by capturing an image of a document whose ground color is bright, in which brightness of a document region is higher than brightness of a background region. At an edge of the document region, brightness is lower than a proper brightness of the background region due to a shadow caused by the edge, causing a sharp brightness change between the document region and the shadow. Then, brightness gradually increases as the distance from the document region increases.

FIG. 21B is a graph illustrating absolute values of differential of the brightness in FIG. 21A. While the brightness change at the edge of the document region increases an absolute value of differential at the document edge, an absolute value of differential within the document region is lower than the absolute value at the edge, since the document region has a uniform ground color. In the background region, although the shadow causes a brightness change, the brightness change is gradual, and therefore an absolute value of its differential is lower than the absolute value at the edge. Accordingly, a position of the document edge corresponds to a maximum value point at which an absolute value of differential is the maximum.

FIG. 21C illustrates a brightness change in the first direction of pixels in image data acquired by capturing an image of a document whose ground color is dark. Brightness of the document region is lower than brightness of the background region. At the edge of the document region, like the example in the FIG. 21A, brightness is lower than a proper brightness in the background region due to a shadow caused by the edge, causing a sharp brightness change between the document region and the shadow. Then, brightness gradually increases as the distance from the document region increases.

FIG. 21D is a graph illustrating the absolute values of differential of the brightness in FIG. 21B. The brightness change at the edge of the document region increases an absolute value of differential at the edge of the document, and absolute values of differential within the document region and the background region are lower than the absolute value at the edge. Accordingly, a position of the document edge corresponds to a maximum value point at which an absolute value of differential is the maximum.

Figure 22A:
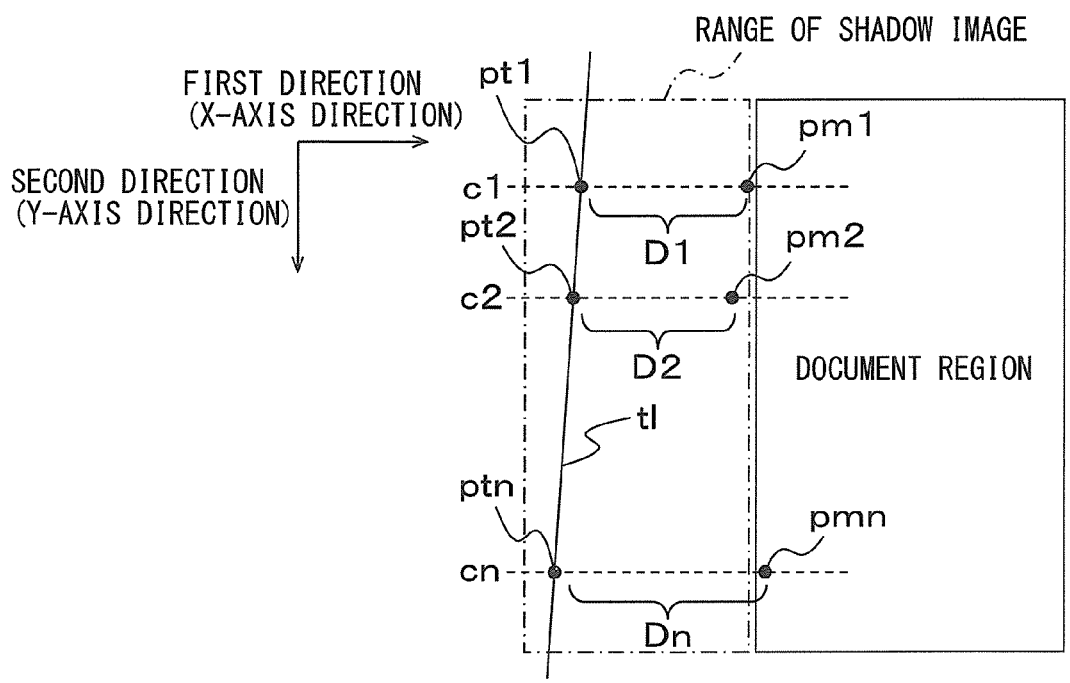
FIG. 22A is a diagram illustrating position shift amounts between maximum value points and a provisional line.

Referring to FIG. 18, at step S503, the distribution calculation unit 81 calculates a frequency distribution of position shift amounts between the maximum value points detected at the respective coordinates c1, c2, . . . cn and the provisional line. FIG. 22A is a diagram illustrating position shift amounts between the maximum value points and the provisional line. Points pt1, pt2, . . . ptn indicate points on the provisional line tl, and their coordinates in the second direction are c1, c2, . . . cn, respectively.

Position shift amounts D1, D2, . . . Dn between the maximum value points pm1, pm2, . . . pmn and the provisional line tl are differences between coordinates in the first direction of the maximum value points pm1, pm2, . . . pmn at the coordinates c1, c2, . . . cn, and coordinates in the first direction of the points Pt1, pt2, . . . ptn, respectively.

Figure 22B:
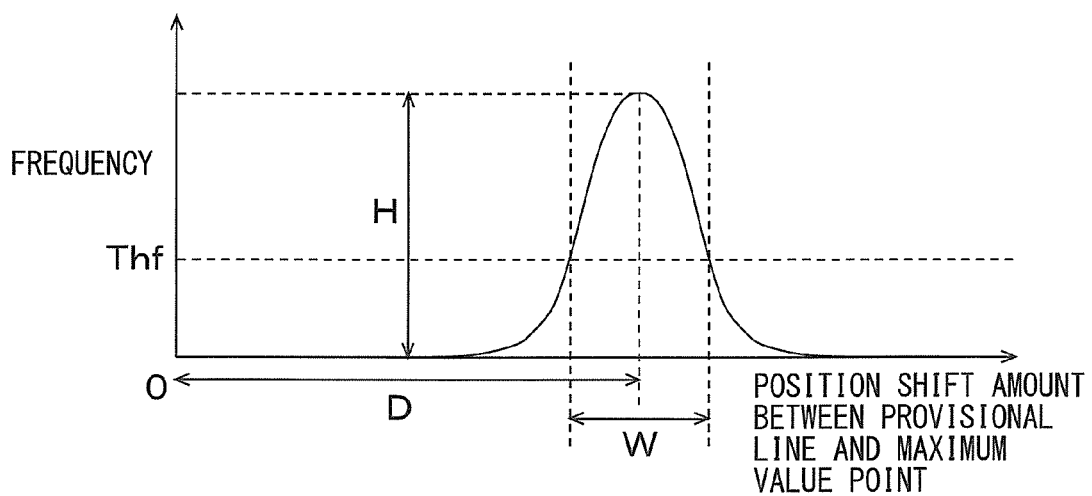
FIG. 22B is a graph illustrating a frequency distribution of the position shift amounts between the maximum value points and a provisional line.

FIG. 22B is a diagram illustrating a frequency distribution of position shift amounts D1, D2, . . . Dn between the maximum value points and the provisional line. When a shadow image is in the focused range, a maximum value point is detected at an edge of the document. Therefore, if a direction of the provisional line and a direction of the edge of the document are the same, the position shift amounts D1, D2, . . . Dn are almost the same. However, unevenness of brightness of the shadow image causes variations of detection positions of maximum value points, and as a result the position shift amounts D1, D2, . . . Dn are dispersed to some extent. Therefore, in the case where the focused range includes a shadow image, a peak whose width W is within a certain range appears in the frequency distribution of the position shift amounts D1, D2, . . . Dn.

Figure 23A:
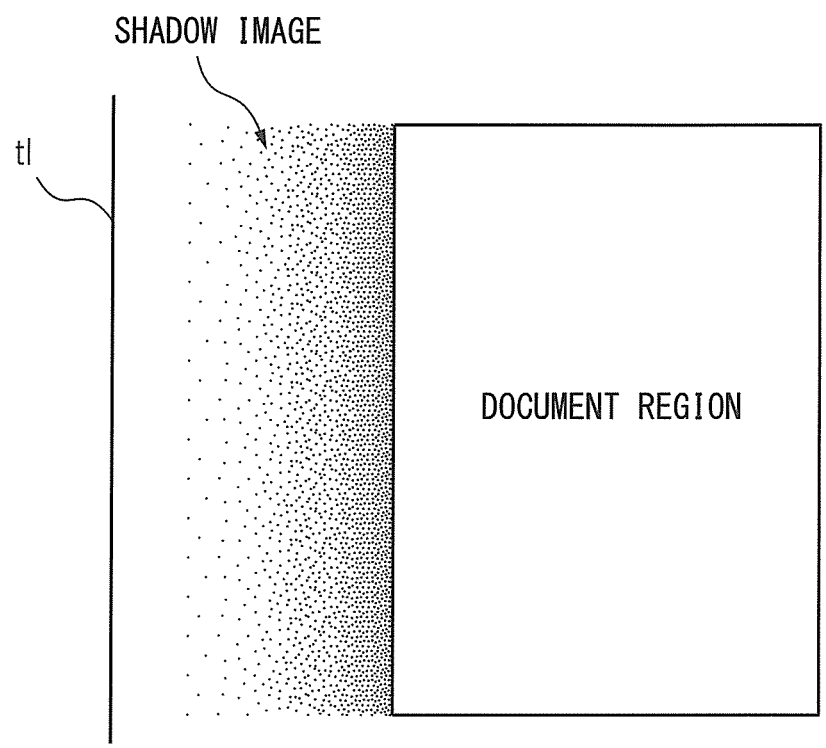
FIG. 23A is a schematic diagram illustrating a state in which a provisional line is apart from a shadow image.
Figure 23B:
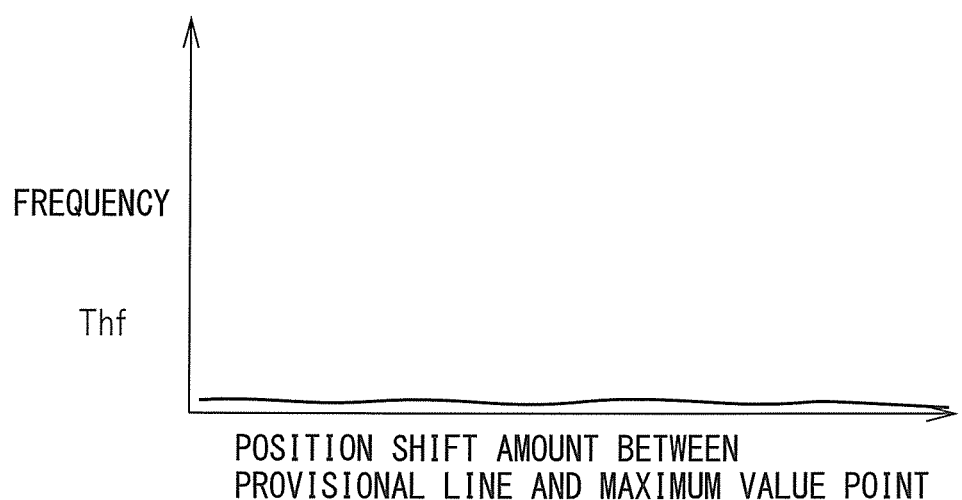
FIG. 23B is a schematic diagram of a frequency distribution calculated in the state in FIG. 23A.

Meanwhile, if the focused range does not include a shadow image, no peak appears, or a width W of a peak, even if a peak appears, exceeds the certain range. FIG. 23A is a schematic diagram illustrating a state in which the provisional line tl is apart from a shadow image. FIG. 23B is a schematic diagram illustrating a frequency distribution calculated in this state. If the provisional line is apart from a shadow image and the shadow image is not included in the focused range, no maximum value point is detected using a brightness change that occurs at an edge of the document, causing variations of maximum value points among the coordinates c1, c2, . . . cn. As a result, no peak appears in the frequency distribution.

Figure 24A:
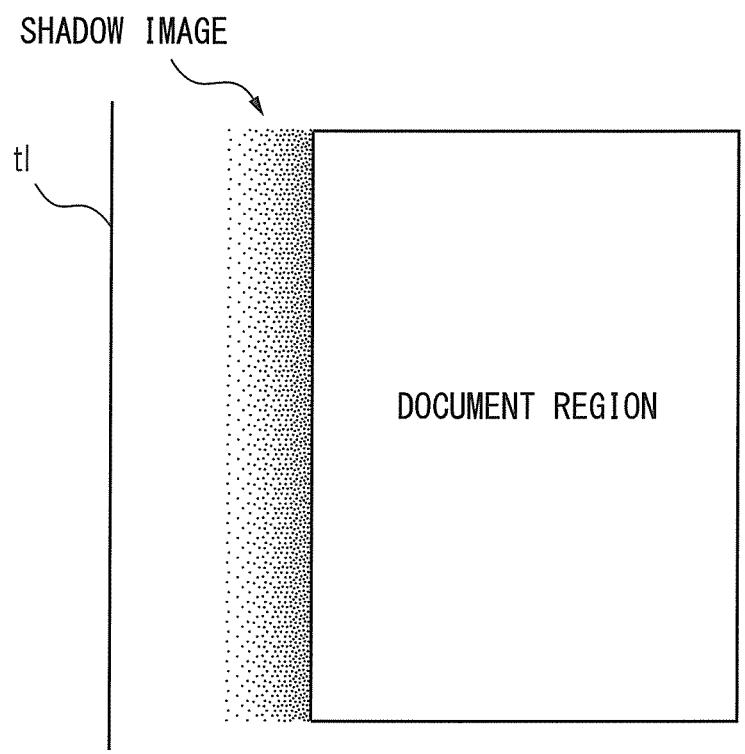
FIG. 24A is a schematic diagram illustrating a state in which vertical line noise is detected as a provisional line.
Figure 24B:
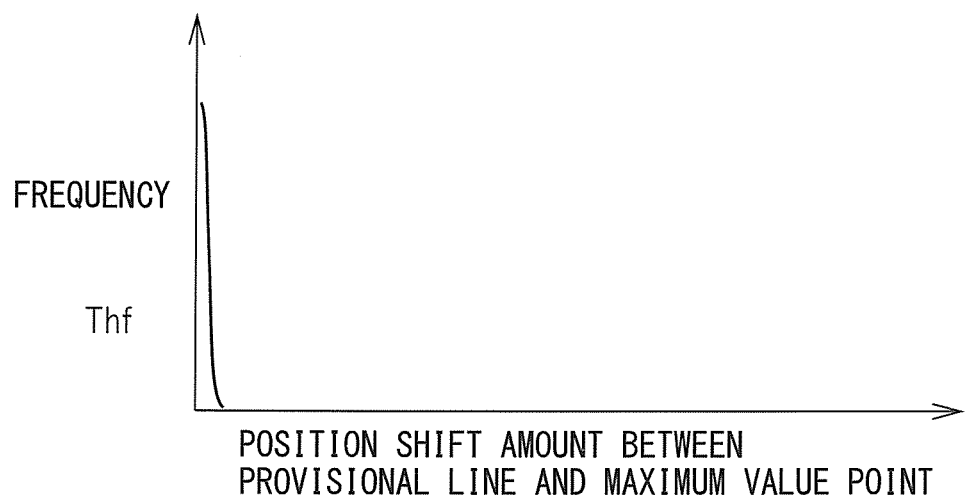
FIG. 24B is a schematic diagram of a frequency distribution calculated in the state in FIG. 24A.

FIG. 24A is a schematic diagram in which vertical line noise is detected as the provisional line tl. FIG. 24B is a schematic diagram of a frequency distribution calculated in this state. If vertical line noise is detected as the provisional line tl, maximum value points are detected by a brightness change between the vertical line noise itself and its adjacent pixels. Therefore, position shift amounts between the maximum value points and the provisional line are always very small, which causes a peak in the frequency distribution. However, since coordinate in X-axis direction (first direction) of a position where vertical line noise occurs does not change and there is no width or bright unevenness, unlike a shadow image, a width of a peak is narrower compared with the case in which the focused range includes a shadow image.

Figure 25A:
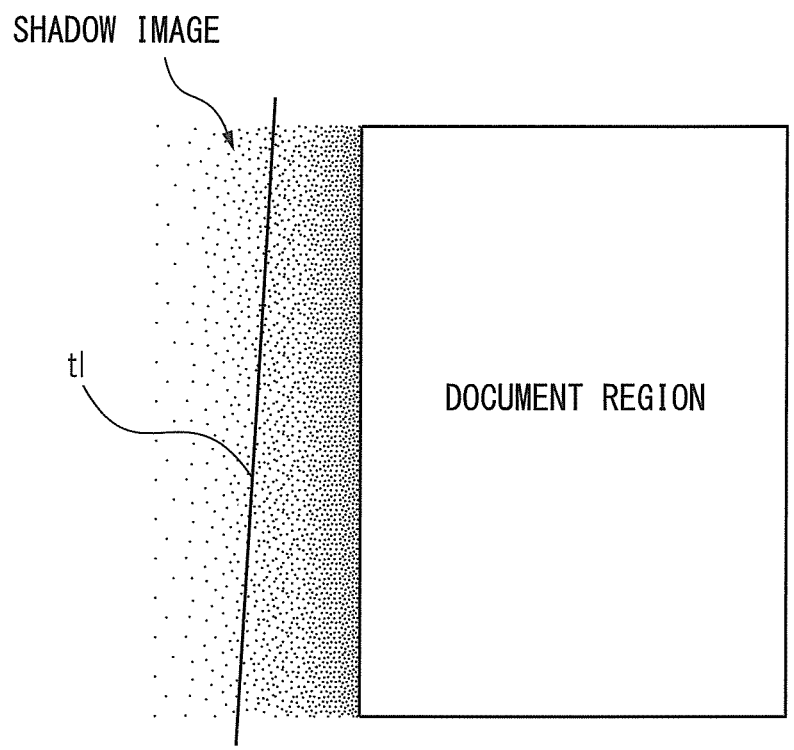
FIG. 25A is a schematic diagram illustrating a state in which a provisional line is inclined at a relatively small angle.
Figure 25B:
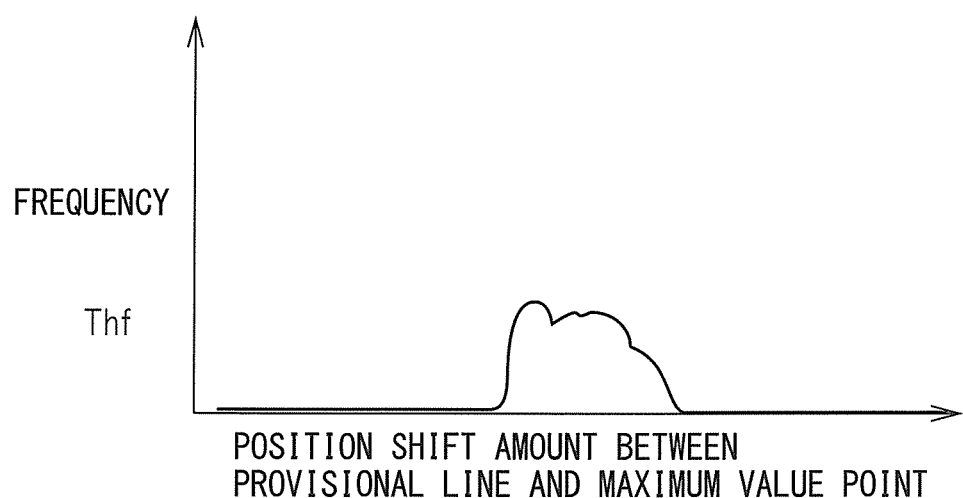
FIG. 25B is a schematic diagram of a frequency distribution calculated in the state in FIG. 25A.

FIG. 25A is a schematic diagram illustrating a state in which the provisional line tl is inclined at a relatively small angle. FIG. 25B is a schematic diagram of a frequency distribution calculated in this state. If the provisional line tl is inclined relative to an edge of the document, distances between the edge of the document where maximum value points are detected and the provisional line tl change; therefore, variations of the position shift amounts D1, D2, . . . Dn increase. As a result, the width W of a peak that appears in the frequency distribution becomes wider. However, if the slope of the provisional line tl is small to some extent, widening of the width W of the peak is reduced.

Figure 26A:
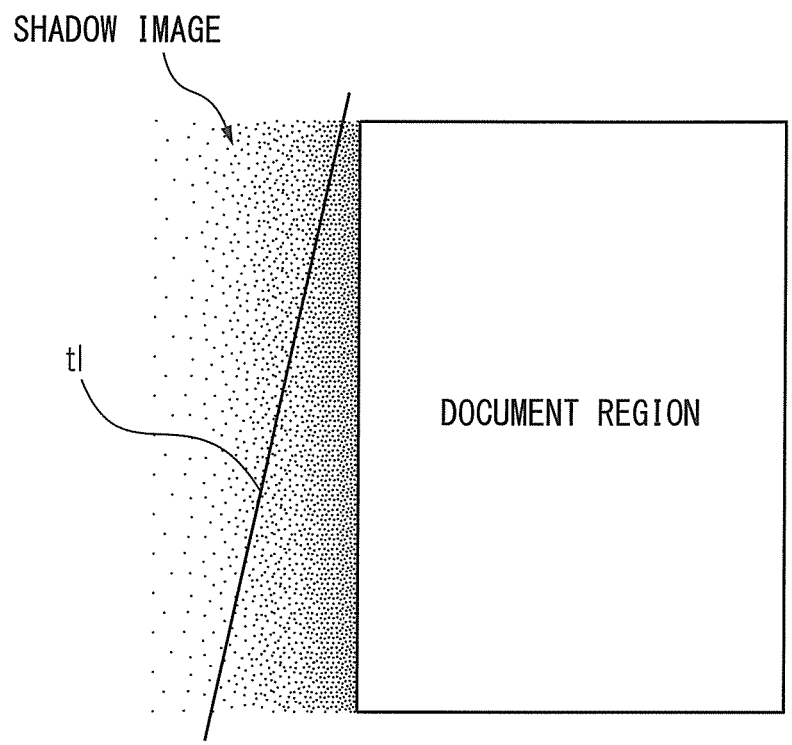
FIG. 26A is a schematic diagram illustrating a state in which a provisional line is inclined at a relatively large angle.
Figure 26B:
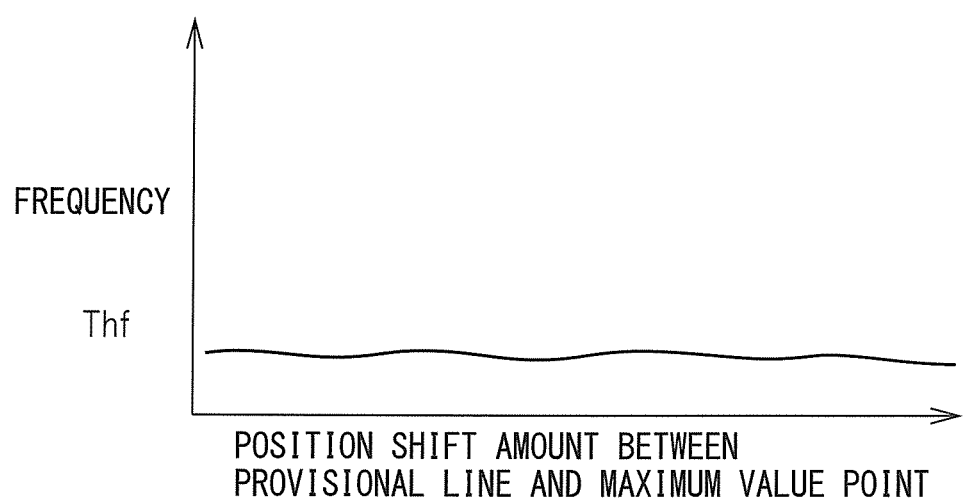
FIG. 26B is a schematic diagram of a frequency distribution calculated in the state in FIG. 26A.

FIG. 26A is a schematic diagram illustrating a state in which the provisional line tl is inclined at a relatively large angle. FIG. 26B is a schematic diagram illustrating a frequency distribution calculated in this state. If the slope of the provisional line tl is excessively large, a change amount of distance between the provisional line tl and the edge of the document is large and therefore the position shift amounts D1, D2, . . . Dn are widely dispersed. Therefore, no peak appears in the frequency distribution.

The determination unit 82 determines whether the focused range includes a shadow image based on the width W of a peak. For example, the determination unit 82 sets a range in which frequency is higher than a predetermined threshold value Thf as the width W of a peak, and determines that the focused range includes a shadow image if this width W is within a predetermined numeral value. As a result, when the slope of the provisional line tl is excessively large even if the focused range includes a shadow image, it is not determined that the focused range includes a shadow image.

For example, in an embodiment, the determination unit 82 determines that the focused range includes a shadow image when the threshold value Thf is 3% of the total frequency and also when the width W is 2 to 6 pixels.

In another embodiment, the determination unit 82 determines whether the focused range includes a shadow image on the basis of the width W and height H of a peak. For example, the determination unit 82 may set a range in which frequency is higher than frequency of a predetermined rate r of the height H, as the width W of a peak. For example, the determination unit 82 may set a range in which frequency is 30% of the height H as the width W of a peak. The determination unit 82 may change a predetermined rate r according to the height H. For example, the determination unit 82 may set, as the width W of a peak, a range in which frequency is 30% of the height H if the height H exceeds 70% of the total frequency and a range in which frequency is 50% of the height H if the height H is equal to or less than 70% of the total frequency.

The determination unit 82 determines a position shift amount D in which the peak maximum occurs, as a detection position of a shadow image. The detection position of the shadow image is used for correcting a position of the provisional line by the correction unit 68. As described with reference to FIGS. 25A, 25B, 26A and 26B, the width W of a peak changes according to the slope of the provisional line tl. Therefore, in a variation of the embodiment, the correction unit 68 may correct the slope of the provisional line according to the width W of a peak.

Referring to FIG. 18, at Step S504 the boundary line determination unit 67 determines whether to adopt the provisional line as the boundary line of the side depending on whether the determination unit 82 determines that the focused range includes a shadow image. If the slope of the provisional line tl is excessively large, the determination unit 82 determines that the focused range does not include a shadow image. Therefore, also in this case, the boundary line determination unit 67 determines that the provisional line is not adoptable. If the provisional line can be adopted as the boundary line (step S504: Y), the processing proceeds to step S505. If the provisional line is not adoptable as the boundary line (step S504: N), the processing proceeds to step S508. At step S505, the boundary line determination unit 67 adopts the provisional line as the boundary line.

At step S506, the shadow detection unit 66 determines whether boundary lines have been determined for all of the sides. If a boundary line has not been determined for all of the sides (step S506: N), the processing proceeds to step S507. If provisional lines have been determined for all of the sides (step S506: Y), the adoption determination processing is terminated. At step S507, the shadow detection unit 66 selects a side whose boundary line has not been determined, and the processing returns to step S502.

If the provisional line is not adoptable as the boundary line, the provisional line determination processing in FIG. 17 is performed again to newly determine a provisional line. At step S508 the provisional line determination unit 65 determines whether a line group that has not been used for provisional line calculation remains, that is, whether a line group that has not been selected at step S401 remains. If such a line group remains (step S508: Y), the processing proceeds to step S509. If such a line group does not remain (step S508: N), the processing proceeds to step S511.

At step S509, the provisional line determination unit 65 discards the line group used for provisional line calculation. At step S510, the provisional line determination unit 65 performs the provisional line determination processing again to newly determine a provisional line. Thereafter, the processing returns to step S502 and it is determined whether the newly-determined provisional line can be adopted as the boundary line.

If the provisional line determination unit 65 has not found an adoptable provisional line even when selecting all of the line groups, the line group generation processing in FIG. 14 is performed again to newly generate a line group. At step S511, the approximate line calculation unit 64 determines whether the line group generation processing is repeated N1 times for the same coordinate group. Here, N1 is a positive integer. If the line group generation processing has been repeated N1 times (step S511: Y), the processing proceeds to step S514. If the line group generation processing has not been repeated N1 times (step S511: N), the processing proceeds to step S512.

At step S512, the provisional line determination unit 65 changes a threshold value Th2 to be used for determination at step S307, which in turn changes a line group to be generated.

At step S513 the approximate line calculation unit 64 and provisional line determination unit 65 performs the line group generation processing again. Thereafter, at step S510, the provisional line determination unit 65 performs the provisional line determination processing on the regenerated line group to newly determine a provisional line. Thereafter, the processing returns to step S502.

If no adoptable provisional line can be found after repeating the line group generation processing N1 times for the same coordinate group, the coordinate group generation processing in FIG. 9 is performed again to newly generate a coordinate group. At step S514, the classification unit 63 determines whether the coordinate group generation processing has been repeated N2 times for the same candidate pixel. Here, N2 is a positive integer. If the coordinate group generation processing has been repeated N2 times (step S514: Y), the processing proceeds to step S518. If the coordinate group generation processing has not been repeated N2 times (step S514: N), the processing proceeds to step S515.

At step S515, the classification unit 63 changes a threshold Th1 to be used for detection of an inflexion point at step S209, which in turn changes a coordinate group to be generated. At step S516, the classification unit 63 resets a counted number of repeats of the line group generation processing to be "0". As a result, when an adoptable provisional line have not been found after regenerating a coordinate group, the line group generation processing can be repeated up to N1 times.

At step S517, the classification unit 63 performs the coordinate group generation processing again. Thereafter, at step S513, the approximate line calculation unit 64 and provisional line determination unit 65 perform the line group generation processing again on the regenerated line group to newly determine a line group. Then at step S510, the provisional line determination unit 65 newly determines a provisional line. Thereafter, the processing returns to step S502.

If no adoptable provisional line can be found after repeating the coordinate group generation processing N2 times for the same candidate pixel, the candidate pixel detection processing S102 in FIG. 3 is performed again to newly detect a candidate pixel. At step S518, the candidate pixel detection unit 61 determines whether the candidate pixel detection processing has been repeated N3 times for the same side. Here, N3 is a positive integer. If the candidate pixel detection processing has been repeated N3 times (Step S518: Y), the processing proceeds to step S522. If the candidate pixel detection processing has not been repeated N3 times (step S518: N), the processing proceeds to step S519.

At step S519, the candidate pixel detection unit 61 changes a detection threshold value to be used for detecting a candidate pixel. For example, the candidate pixel detection unit 61 detects a focused pixel as a candidate pixel according to a result of comparing a brightness difference between the focused pixel and its adjacent pixel with this threshold value. Changing a detection threshold value in this way changes a candidate pixel to be detected.

At step S520, the candidate pixel detection unit 61 resets counted numbers of repeats of the line group generation processing and coordinate group generation processing to be "0". As a result, if no adoptable provisional line can be found after newly detecting a candidate pixel, the line group generation processing and coordinate group generation processing can be performed up to (N1×N2) times and N2 times, respectively.

At step S521, the candidate pixel detection unit 61 performs the candidate pixel detection processing again. Thereafter, at step S517 the classification unit 63 performs the coordinate group generation processing again on the newly-detected candidate pixel to newly determine a coordinate group. Then at step S513, the approximate line calculation unit 64 and provisional line determination unit 65 newly determine a line group, and at step S510 the provisional line determination unit 65 newly determines a provisional line. Thereafter, the processing returns to step S502.

If no adoptable provisional line can be found after repeating the candidate pixel detection processing N3 times for the same side, it is determined that detection of a boundary line has failed, and at step S522, the processing is abnormally terminated. In this case, the boundary line correction processing S110 and image cropping processing S111 in FIG. 3 are canceled.

<2.4. Effects of the Embodiment>

In accordance with the present embodiment, since whether to adopt a provisional line calculated as a candidate of a boundary line of a side of a document region can be determined using a shadow image of the document, a calculation accuracy of the boundary line is improved. Moreover, since the candidate coordinate detection processing, coordinate group generation processing, line group generation processing and provisional line determination processing are repeated until a suitable provisional line is found, the possibility of calculating a highly-accurate boundary line can be increased.

In addition, since the position and angle of the provisional line is corrected based on a detected shadow image, a calculation accuracy of the boundary line is improved.

<3. Second Embodiment>

Next, another embodiment of the image processing system 1 will be described. In the present embodiment, a boundary line is selected from among a plurality of approximate lines calculated based on candidate pixels belonging to coordinate groups using a shadow image of an edge of a document. Therefore, the provisional line determination processing may be skipped.

FIG. 27 is a diagram illustrating a second embodiment of processing by the image processing system 1. At step S601 the image processing system 1 takes image data as input. At step S602 the image processing system 1 detects, for each of the sides of the document region, candidate pixels that are candidates for pixels composing a boundary line between the document region and outside of the document region.

At step S603, the image processing system 1 selects any one of the sides of the document region. Step S604 is performed for each of the sides of the document region. At step S604, the image processing system 1 classifies the candidate pixels detected at a plurality of points of the boundary line 53 into different groups thereby to generate a plurality of coordinate groups. The coordinate group generation processing in step S604 may be the same as the coordinate group generation processing at S104 in FIG. 3.

At step S605, the image processing system 1 determines whether coordinate groups have been generated for all of the sides. If a coordinate group has not been generated for all of the sides (step S605: N), the processing proceeds to step S606. If coordinate groups have been generated for all of the sides (step S605: Y), the processing proceeds to S607. At step S606, the image processing system 1 selects a side for which a coordinate group has not been generated, and the processing returns to step S604.

At step S607, the image processing system 1 calculates for each of the sides, respective approximate lines of the boundary line based on the candidate pixels belonging to the respective coordinate groups. The image processing system 1 selects any of the approximate lines as a boundary line according to a detection result of a shadow image of an edge of the document within a predetermined distance from each of the approximate lines.

At step S608, the image processing system 1 corrects the boundary line according to a detection position of the shadow image. At step S609, the image processing system 1 crops an image of the document region out of the inputted image data by the positions of the boundary lines determined at step S608. Thereafter, the processing is terminated.

Figure 28:
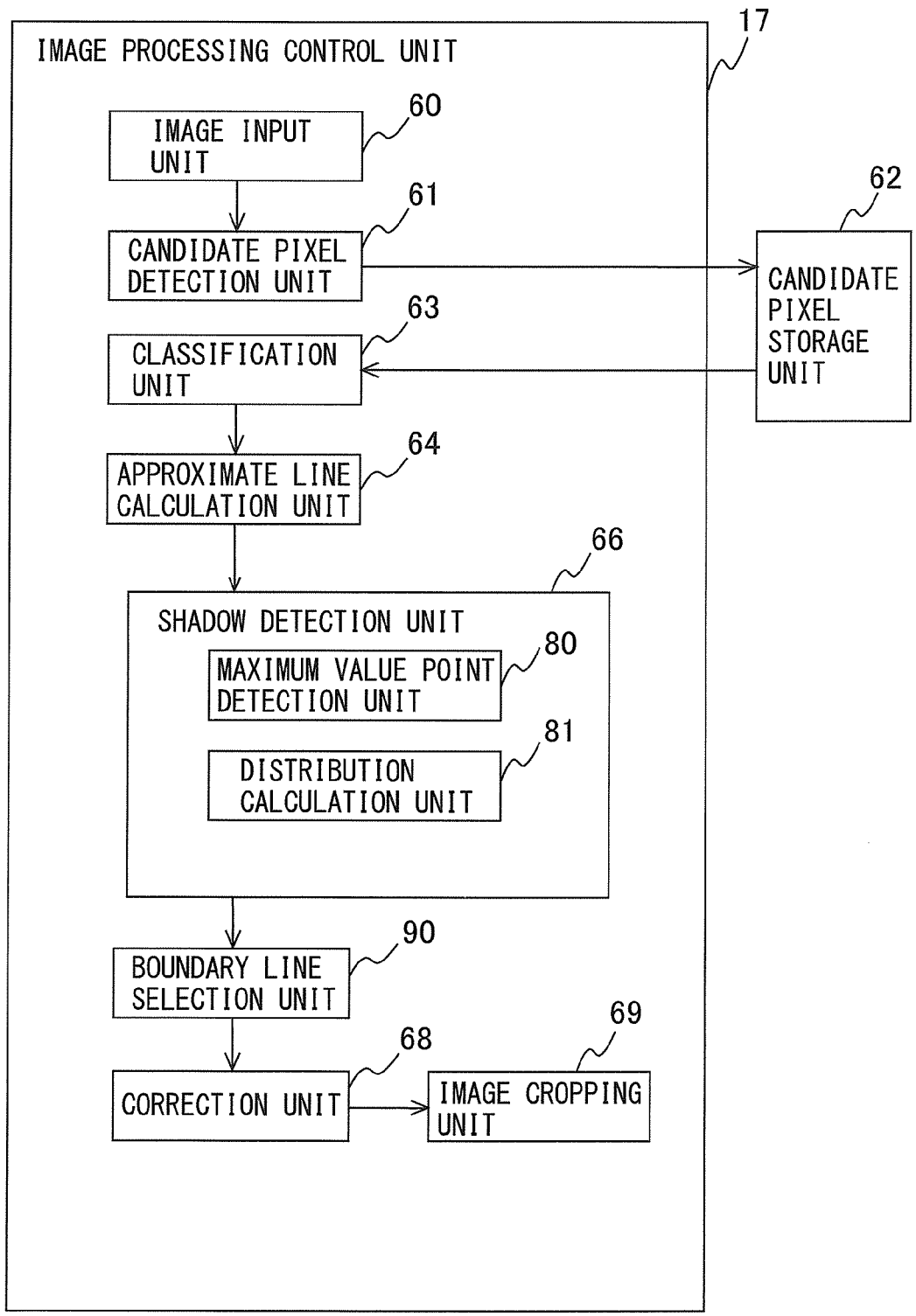
FIG. 28 is a diagram illustrating a second example of configuration of the image processing control unit 17.

FIG. 28 is a diagram illustrating a second embodiment of configuration of the image processing control unit 17. The same components as the components depicted in FIG. 7 are denoted by same reference numerals. Operation of the components denoted by the same reference numerals is the same unless otherwise indicated. The image processing control unit 17 in FIG. 28 includes a boundary line selection unit 90. FIG. 28 mainly illustrates the functions related to the following description. Therefore, the image processing control unit 17 may include components other than the depicted components.

The approximate line calculation unit 64 calculates respective approximate lines of the boundary line 53 based on the candidate pixels belonging to respective coordinate groups. The shadow detection unit 66 searches for a shadow image of an edge of the document within a predetermined distance D from the approximate lines calculated by the approximate line calculation unit 64. The boundary line selection unit 90 selects for each of the sides of the document region, one of the approximate lines as a boundary line according to a detection result of the shadow image.

The correction unit 68 corrects a position of the boundary line selected by the boundary line selection unit 90 according to a detection position of the shadow image. The correction unit 68 may correct an angle of the boundary line, like the correction of the provisional line according to the first embodiment. The cropping unit 69 crops an image of the document region out of the inputted image data by the positions of the boundary lines corrected by the correction unit 68.

Figure 29:
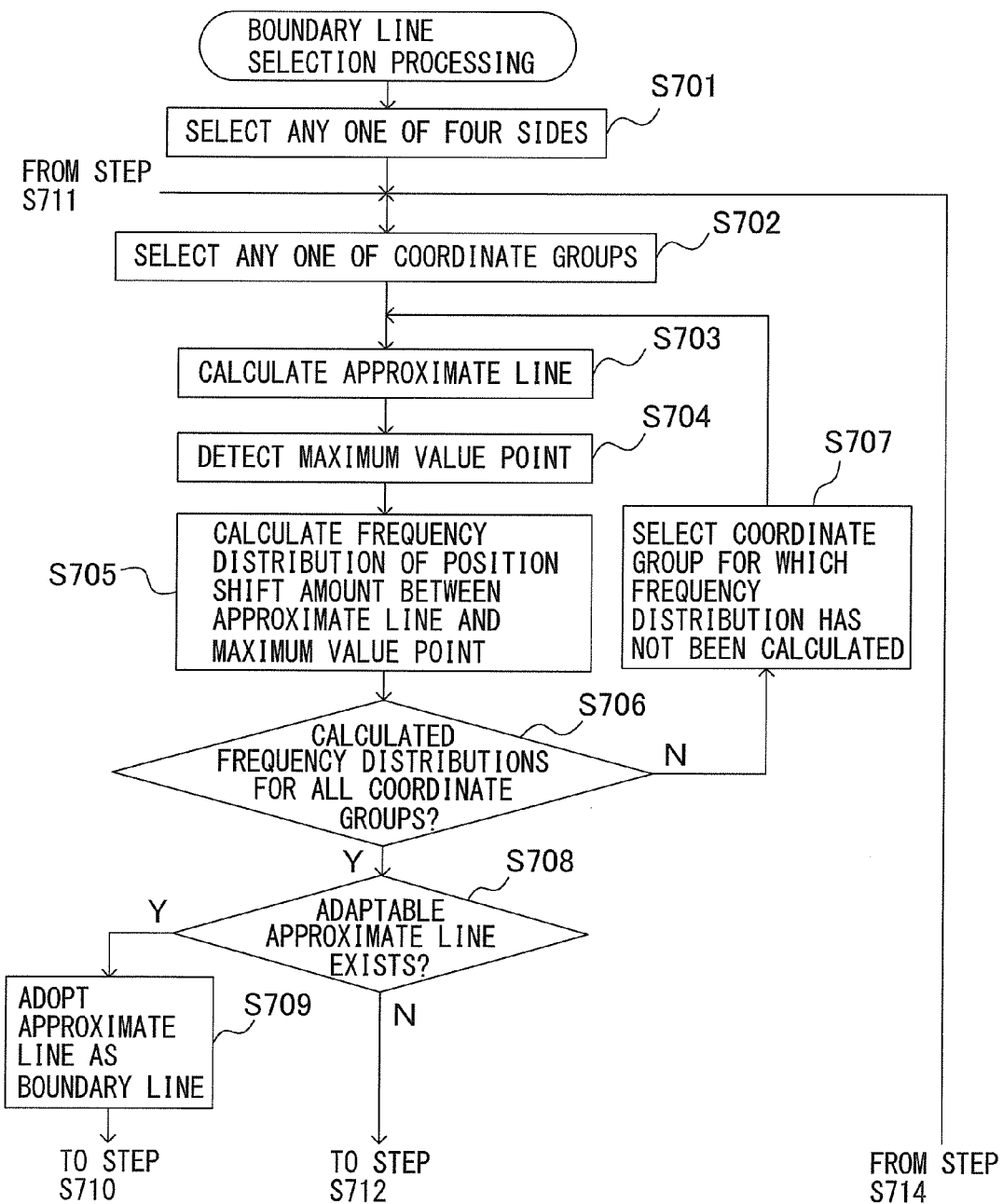
FIG. 29 is a diagram illustrating one example of boundary selection processing.
Figure 30:
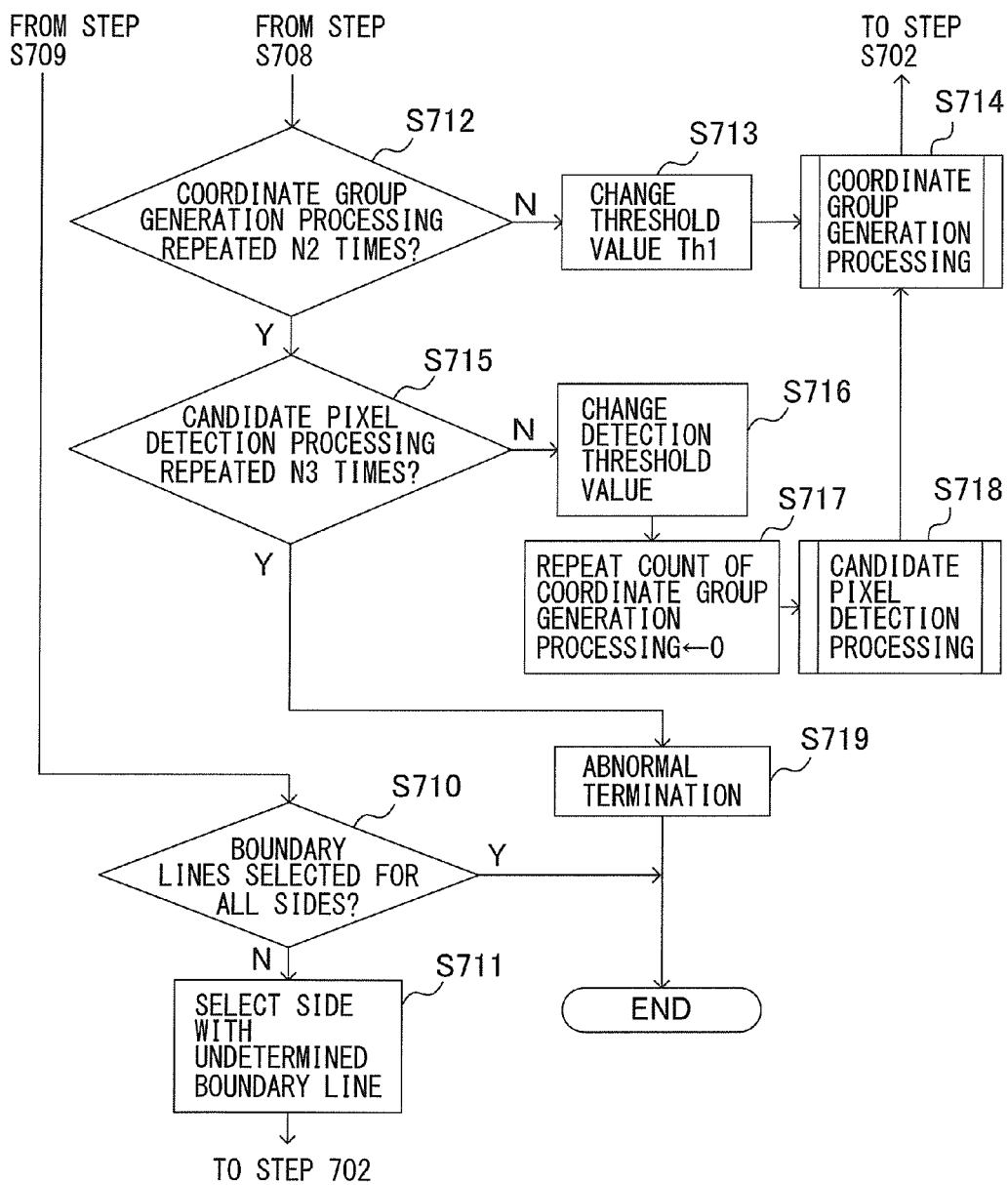
FIG. 30 is a diagram illustrating one example of boundary selection processing.

FIGS. 29 and 30 are diagrams illustrating one example of the boundary line selection processing. The boundary line selection processing in FIGS. 29 and 30 correspond to the boundary line selection processing at S607 in FIG. 27. At step S701, the shadow detection unit 66 selects any one of the sides of the document region. The following steps S702 to S710 and S712 to 719 are performed for each of the sides of the document region.

At step S702, the approximate line calculation unit 64 selects any one of coordinate groups generated for the selected side. At step S703, the approximate line calculation unit 64 calculates an approximate line of the boundary line of the side based on the candidate pixels belonging to the selected coordinate group.

Figure 31:
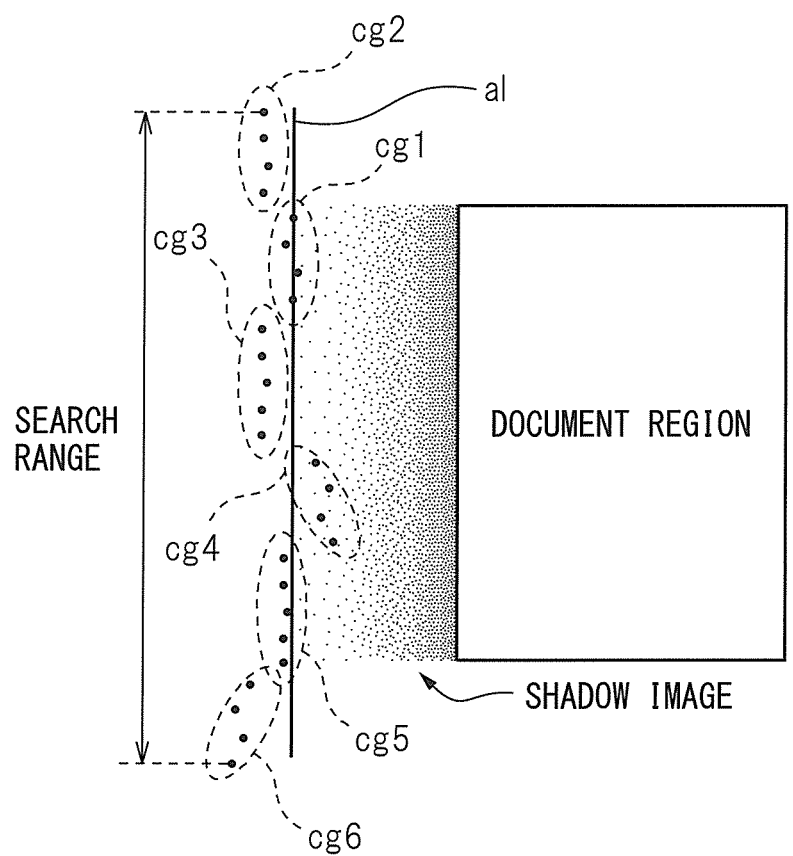
FIG. 31 is a diagram illustrating search processing according to a second embodiment.

At step S704, the maximum value point detection unit 80 detects a maximum value point at every plurality of coordinates on the approximate line. FIG. 31 is a diagram illustrating the search range for maximum value points in the second embodiment. Suppose a case in which a shadow image is searched for within a predetermined distance D from the approximate line a1 calculated based on the candidate coordinates that belong to the coordinate group cg1.

The coordinate groups cg1 to cg6 are all coordinate groups of candidate pixels detected for the left side. The search range may be, for example, a range between the minimum value and the maximum value of coordinates in the second direction of candidate pixels detected on the same side as the side on which the coordinate group cg1 is generated.

At step S705, the distribution calculation unit 81 calculates a frequency distribution of position shift amounts between maximum value points detected at every plurality coordinates on the approximate line and the approximate line. At step S706, the shadow detection unit 66 determines whether frequency distributions have been calculated for all of the coordinate groups. If a frequency distribution has not been calculated for all of the coordinate groups (step S706: N), the processing proceeds to step S707. If frequency distributions have been calculated for all of the coordinate groups (step S706: Y), the processing proceeds to step S708. At step S707, the shadow detection unit 66 selects a coordinate group for which a frequency distribution has not been calculated, and the processing returns to step S703.

At step S708, the boundary line selection unit 90 determines whether the focused range includes a shadow image, thereby determining whether to adopt each of the approximate lines as a boundary line. If there is an adoptable approximate line (step S708: Y), the processing proceeds to step S709. If there is no adoptable approximate line (step S708: N), the processing proceeds to step S712.

At Step S709, the boundary line selection unit 90 adopts the approximate line as the boundary line. At step S710, the shadow detection unit 66 determines whether boundary lines have been selected for all of the sides. If a boundary line has not been selected for all of the sides (step S710: N), the processing proceeds to step S711. When boundary lines have been determined for all of the sides (step S710: Y), the boundary line selection processing is terminated. At step S711, the shadow detection unit 66 selects a side for which a boundary line has not been selected, and the processing returns to step S702.

If no approximate line can be adopted as a boundary line, the coordinate group generation processing in FIG. 9 is performed again. At step S712, the classification unit 63 determines whether the coordinate group generation processing has been repeated N2 times for the same candidate pixel. If the coordinate group generation processing has been repeated N2 times (step S712: Y), the processing proceeds to step S715. If the coordinate group generation processing has not been repeated N2 times (step S712: N), the processing proceeds to step S713.

At step S713, the classification unit 63 changes a threshold value Th1. At step S714, the classification unit 63 performs the coordinate group generation processing again. Thereafter, the processing proceeds to step S702.

If no adoptable approximate line can be found after repeating the coordinate group generation processing N2 times for the same candidate pixel, the candidate pixel detection processing at S102 in FIG. 3 is performed again. At step S715, the candidate pixel detection unit 61 determines whether the candidate pixel detection processing is repeated N3 times for the same side. If the candidate pixel detection processing has been performed N3 times (step S715: Y), the processing proceeds to step S719. If the candidate pixel detection processing has not been repeated N3 times (step S715: N), the processing proceeds to step S716.

At step S716, the candidate pixel detection unit 61 changes a detection threshold value to be used for detecting a candidate pixel. At step S717, the candidate pixel detection unit 61 resets a counted number of repeats of the coordinate group generation processing to "0". At step S718, the candidate pixel detection unit 61 performs the candidate pixel detection processing again. Thereafter, at step S714, the classification unit 63 performs the coordinate group generation processing again and the processing returns to step S702.

If no adoptable provisional line can be found after repeating the candidate pixel detection processing N3 times for the same side, it is determined that detection of a boundary line has failed, and at step S719, the processing is abnormally terminated. In this case, the boundary line correction processing S608 and image cropping processing at S609 in FIG. 27 are canceled.

According to the present embodiment, since whether to adopt an approximate line calculated as a boundary line of the side of the document region can be determined by using a shadow image of an edge of the document, calculation accuracy of the boundary line is improved. Moreover, the candidate coordinate detection processing and coordinate group generation processing are repeated until a suitable approximate lines is found, which increases the possibility of calculating a highly-accurate boundary line.

Moreover, the position and angle of the boundary line are corrected based on the detected shadow image, which increases the calculation accuracy of the boundary line.

According to the apparatus or the method disclosed in this specification, it is possible to determine incorrect detection when a boundary line between a document region and a background region is incorrectly detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   a candidate pixel detection circuit for detecting candidate pixels that are candidates for pixels constituting a boundary line of a side of a document region from image data;
   a classifier circuit for classifying coordinates of the candidate pixels into a plurality of coordinate groups;
   an approximate line calculation circuit for calculating a plurality of approximate lines for the boundary line based on the coordinates belonging to each of the plurality of coordinate groups;
   a provisional line determination circuit for selecting any one of the approximate lines based on the number of candidate pixels that are within a first predetermined distance from the respective approximate lines and determining a provisional line of the boundary line based on the selected approximate line;
   a shadow detection circuit for detecting a shadow image of an edge of the document within a second predetermined distance from the provisional line; and
   a boundary line determination circuit for determining that the boundary line is within the second predetermined distance from the provisional line when the shadow image is detected within the second predetermined distance.

2. The image processing apparatus according to claim 1, further comprising a correction circuit for correcting a position of the provisional line according to a detected position of the shadow image to determine the boundary line.

3. The image processing apparatus according to claim 1, wherein the shadow detection circuit comprises:
a maximum value point detection circuit for detecting a maximum value point at which differential of a pixel along a first direction is a maximum value at every plurality of coordinates in a second direction orthogonal to the first direction, the first direction being from the provisional line to inside of the document region;
a distribution calculation circuit for calculating a frequency distribution of difference, for each maximum value point detected for each of the plurality of coordinates in the second direction, between a coordinate in the first direction of each of the maximum value points and a coordinate in the first direction of an intersection of a line that passes through the maximum value point and extends in the first direction and the provisional line; and
a determination circuit for determining the presence or absence of the shadow image according to the frequency distribution.

4. The image processing apparatus according to claim 3, wherein the determination circuit determines the presence or absence of the shadow image on the basis of the height and width of a peak appearing in the frequency distribution.

5. The image processing apparatus according to claim 3, wherein the shadow detection circuit specifies a position of the shadow image according to a position of a peak appearing in the frequency distribution.

6. The image processing apparatus according to claim 1, wherein when the boundary line determination circuit determines that there is no boundary line within the second predetermined distance from the provisional line, the provisional line determination circuit selects from among the approximate lines, a new approximate line other than the selected approximate line, and determines a new provisional line based on the selected new approximate line.

7. The image processing apparatus according to claim 1, wherein the approximate line calculation circuit calculates the plurality of approximate lines so that a distance between any one of the coordinate groups and the approximate line is equal to or less than a predetermined threshold value, and when the boundary line determination circuit determines that there is no boundary line within the second predetermined distance from any of the approximate lines, the approximate line calculation circuit changes the predetermined threshold value and calculates a new plurality of approximate lines.

8. The image processing apparatus according to claim 7, wherein the classifier circuit determines whether or not to classify consecutive candidate pixels into the same coordinate group depending on whether a change amount of a direction of a line connecting the consecutive candidate pixels is less than or equal to a predetermined second threshold value, and wherein
when the boundary line determination circuit determines that there is no boundary line within them second predetermined distance from any of the new approximate lines, the classifier circuit changes the predetermined second threshold value to classify a new coordinate group.

9. The image processing apparatus according to claim 8, wherein when the boundary line determination circuit determines that there is no boundary line within the second predetermined distance from an approximate line calculated based on the coordinate group newly classified by the classifier circuit, the candidate pixel detection circuit changes a detection threshold value to detect a new candidate pixel.

10. An image processing system comprising an image reading device and a computer that receives an image read by the image reading device via communication with the image reading device, the image processing system comprising:
a candidate pixel detection circuit for detecting candidate pixels that are candidates for pixels constituting a boundary line of a side of a document region from image data;
a classifier circuit for classifying coordinates of the candidate pixels into a plurality of coordinate groups;
an approximate line calculation circuit for calculating a plurality of approximate lines for the boundary line based on the coordinates belonging to each of the plurality of coordinate groups;
a provisional line determination circuit for selecting any one of the approximate lines based on the number of candidate pixels that are within a first predetermined distance from the respective approximate lines and determining a provisional line of the boundary line based on the selected approximate line;
a shadow detection circuit for detecting a shadow image of an edge of the document within a second predetermined distance from the provisional line; and
a boundary line determination circuit for determining that the boundary line is within the second predetermined distance from the provisional line when the shadow image is detected within the second predetermined distance.

11. A computer-readable, non-transitory medium storing a computer program for causing a computer to execute a process, the process comprising:
detecting candidate pixels that are candidates for pixels constituting a boundary line of a side of a document region from image data;
classifying coordinates of the candidate pixels into a plurality of coordinate groups;
calculating a plurality of approximate lines for the boundary line based on the coordinates belonging to each of the plurality of coordinate groups;
selecting any one of the approximate lines based on the number of candidate pixels that are within a first predetermined distance from the respective approximate lines and determining a provisional line of the boundary line based on the selected approximate line;
detecting a shadow image of an edge of the document within a second predetermined distance from the provisional line; and
determining that the boundary line is within the second predetermined distance from the provisional line when the shadow image is detected within the second predetermined distance.

* * * * *